United States Patent
Seo et al.

(10) Patent No.: US 9,516,601 B2
(45) Date of Patent: Dec. 6, 2016

(54) METHOD AND APPARATUS FOR DETERMINING TRANSMISSION POWER OF UPLINK CONTROL CHANNEL IN WIRELESS COMMUNICATION SYSTEM

(71) Applicant: LG ELECTRONICS INC., Seoul (KR)

(72) Inventors: Dongyoun Seo, Seoul (KR); Suckchel Yang, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/415,058

(22) PCT Filed: Jul. 19, 2013

(86) PCT No.: PCT/KR2013/006507
§ 371 (c)(1),
(2) Date: Jan. 15, 2015

(87) PCT Pub. No.: WO2014/014319
PCT Pub. Date: Jan. 23, 2014

(65) Prior Publication Data
US 2015/0173024 A1 Jun. 18, 2015

Related U.S. Application Data

(60) Provisional application No. 61/673,717, filed on Jul. 19, 2012, provisional application No. 61/678,619, filed on Aug. 1, 2012, provisional application No. 61/706,760, filed on Sep. 27, 2012, provisional application No. 61/711,181, filed on Oct. 8, 2012, provisional application No. 61/718,709, filed on Oct. 26, 2012.

(51) Int. Cl.
*H04W 4/00* (2009.01)
*H04W 52/14* (2009.01)
(Continued)

(52) U.S. Cl.
CPC ......... *H04W 52/146* (2013.01); *H04W 52/325* (2013.01); *H04W 72/0413* (2013.01); *H04W 52/48* (2013.01)

(58) Field of Classification Search
None
See application file for complete search history.

(56) References Cited

U.S. PATENT DOCUMENTS

2010/0227638 A1  9/2010  Park et al.
2011/0274205 A1  11/2011  Lee et al.
(Continued)

FOREIGN PATENT DOCUMENTS

EP     2645788 A1    10/2013
KR  10-2010-0088518 A  8/2010
(Continued)

OTHER PUBLICATIONS

Catt et al., "Way forward on HARQ-ACK transmission for TDD inter-band CA," 3GPP TSG RAN WG1 Meeting #69, May 21-25, 2012, 4 pages, R1-112966, XP50601200. LG Electronics, "Remaining issues on ACK/NACK feedback for TDD CA with different UL-DL configurations," 3GPP TSG RAN WG1 #70bis, Oct. 8-12, 2012, 5 pages, R1-124311, XP50662211.
(Continued)

*Primary Examiner* — Michael J Moore, Jr.
(74) *Attorney, Agent, or Firm* — Birch, Stewart, Kolasch & Birch, LLP

(57) ABSTRACT

Disclosed are a method for determining the transmission power of an uplink control channel of a terminal which has been assigned, by a base station, two cells that have different UL-DL configurations, and an apparatus using the method. The method comprises: choosing a larger value between N1, the number of downlink subframes that correspond to subframe n of a first cell having a first UL-DL configuration, and N2, the number of downlink subframes that correspond to subframe n of a second cell having a second UL-DL configuration; and determining a parameter value based on the chosen value, wherein the parameter determines the transmission power of an uplink control channel which is transmitted in subframe n.

8 Claims, 17 Drawing Sheets

(51) Int. Cl.
*H04W 52/32* (2009.01)
*H04W 72/04* (2009.01)
*H04W 52/48* (2009.01)

(56) References Cited

U.S. PATENT DOCUMENTS

2012/0320859 A1* 12/2012 Ahn .................... H04L 1/1607
370/329
2013/0272233 A1* 10/2013 Dinan ............... H04W 72/0473
370/329
2013/0279433 A1* 10/2013 Dinan ............... H04W 56/0005
370/329

FOREIGN PATENT DOCUMENTS

KR   10-2010-0100592 A   9/2010
KR   10-2012-0048446 A   5/2012
WO   WO 2010/101443 A2   9/2010
WO   WO 2012/068983 A1   5/2012

OTHER PUBLICATIONS

Ericsson et al., "Accumulation of power control commands from DCI format 3/3A," 3GPP TSG-RAN1 Meeting #66bis, R1-112919, Zhuhai, China, Oct. 10-14, 2011, pp. 1-8.

* cited by examiner

METHOD AND APPARATUS FOR DETERMINING TRANSMISSION POWER OF UPLINK CONTROL CHANNEL IN WIRELESS COMMUNICATION SYSTEM

CROSS REFERENCE TO RELATED APPLICATIONS

This application is the National Phase of PCT/KR2013/006507 filed on Jul. 19, 2013, which claims priority under 35 U.S.C. 119(e) to U.S. Provisional Application Nos. 61/673,717 filed on Jul. 19, 2012; 61/678,619 filed on Aug. 1, 2012; 61/706,760 filed on Sep. 27, 2012; 61/711,181 filed on Oct. 8, 2012, and 61/718,709 filed on Oct. 26, 2012, all of which are hereby expressly incorporated by reference into the present application.

BACKGROUND OF THE INVENTION

1. Field of the Invention

The present invention relates to wireless communications, and more particularly, to a method of determining transmit power of an uplink control channel in a wireless communication system, and an apparatus using the method.

2. Related Art $3^{rd}$ generation partnership project (3GPP) long term evolution-advanced (LTE-A) supports a carrier aggregation in which a plurality of carriers are aggregated and allocated to a user equipment.

A carrier used in the carrier aggregation may be a carrier which uses a time division duplex (TDD)-based frame (i.e., a TDD frame). The TDD frame may have various uplink (UL)-downlink (DL) configurations. In TDD, it is conventionally assumed that each carrier has the same UL-DL configuration in the carrier aggregation. However, it is recently considered to aggregate carriers having different UL-DL configurations.

Meanwhile, a wireless communication system may use a hybrid automatic repeat request (HARQ). The HARQ is a scheme in which a transmitter transmits data and thereafter receives acknowledgement/not-acknowledgement (ACK/NACK) as reception configuration information for the data, and transmits new data or retransmits previously transmitted data according to the ACK/NACK.

The ACK/NACK may be transmitted through an uplink control channel. In this case, transmit power of the uplink control channel may be determined on the basis of a parameter dependent on a physical uplink control channel (PUCCH). In TDD, the parameter may be defined differently according to the number of DL subframes (the number is denoted by M) matched to uplink subframes in which the ACK/NACK is transmitted.

When carriers having different UL-DL configurations are aggregated in TDD, the value M may vary in the same UL subframe of each carrier. Accordingly, this is necessarily considered in a method required for determining transmit power of a UL control channel.

SUMMARY OF THE INVENTION

The present invention provides a method and apparatus for determining transmit power of an uplink control channel in a wireless communication system.

In an aspect, there is provided a method of determining transmit power of an uplink control channel of a terminal to which two cells having different UL-DL configurations are assigned. The method includes choosing a larger value between N1, the number of downlink subframes corresponding to a subframe n of a first cell having a first UL-DL configuration, and N2, the number of downlink subframes corresponding to a subframe n of a second cell having a second UL-DL configuration; and determining a parameter value based on the chosen value, wherein the parameter determines the transmit power of the uplink control channel which is transmitted in the subframe n, where n, N1, and N2 are integers greater than or equal to 0.

In another aspect, there is provided an apparatus for determining transmit power of an uplink control channel. The apparatus comprises a Radio Frequency (RF) unit for transmitting and receiving a radio signal; and a processor operatively coupled to the RF unit, wherein the processor is configured for choosing a larger value between N1, the number of downlink subframes corresponding to a subframe n of a first cell having a first UL-DL configuration, and N2, the number of downlink subframes corresponding to a subframe n of a second cell having a second UL-DL configuration, and determining a parameter value based on the chosen value, wherein the parameter determines the transmit power of the uplink control channel which is transmitted in the subframe n, where n, N1, and N2 are integers greater than or equal to 0.

Transmit power can be effectively allocated when a user equipment to which a plurality cells having different uplink (UL)-downlink (DL) configurations are assigned transmits acknowledgement/not-acknowledgement (ACK/NACK) through a physical uplink control channel (PUCCH) for a different number of DL subframes for the respective cells.

DESCRIPTION OF EXEMPLARY EMBODIMENTS

User Equipment (UE) may be fixed or mobile, and may be called other terms such as an MS (mobile station), an MT (mobile UE), a UT (user UE), an SS (subscriber station), a wireless device, a PDA (personal digital assistant), a wireless modem, a handheld device, and the like.

Generally, a base station means a fixed station communicating with the UE, and may be called as other terms such as an eNB (evolved-NodeB), a BTS (Base Transceiver System), and an Access Point.

Figure 1:
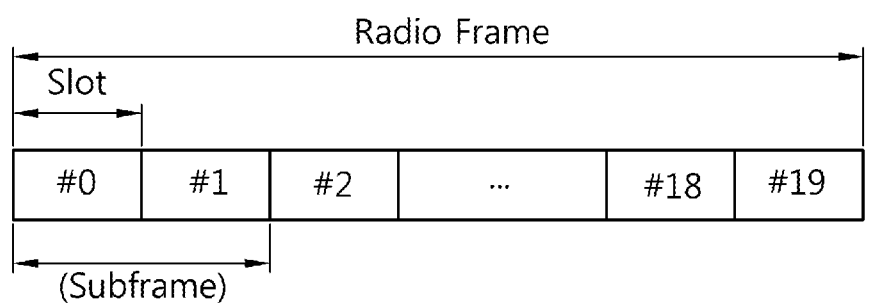
FIG. 1 illustrates a structure of a frequency division duplex (FDD) radio frame in a 3GPP LTE.

FIG. 1 illustrates a structure of a frequency division duplex (FDD) radio frame in a 3GPP LTE. The structure of a frequency division duplex (FDD) radio frame may refer to a fourth section of 3GPP TS 36.211 V8.7.0 (2009-05) "Evolved Universal Terrestrial Radio Access (E-UTRA); Physical Channels and Modulation (Release 8)".

The radio frame includes 10 subframes marked with indexes of 0~9. One subframe includes two continuous slots. A time required to transmit one subframe is a TTI (transmission time interval). For example, a length of one subframe may be 1 ms (milli-second), and a length of one slot may be 0.5 ms.

Figure 2:
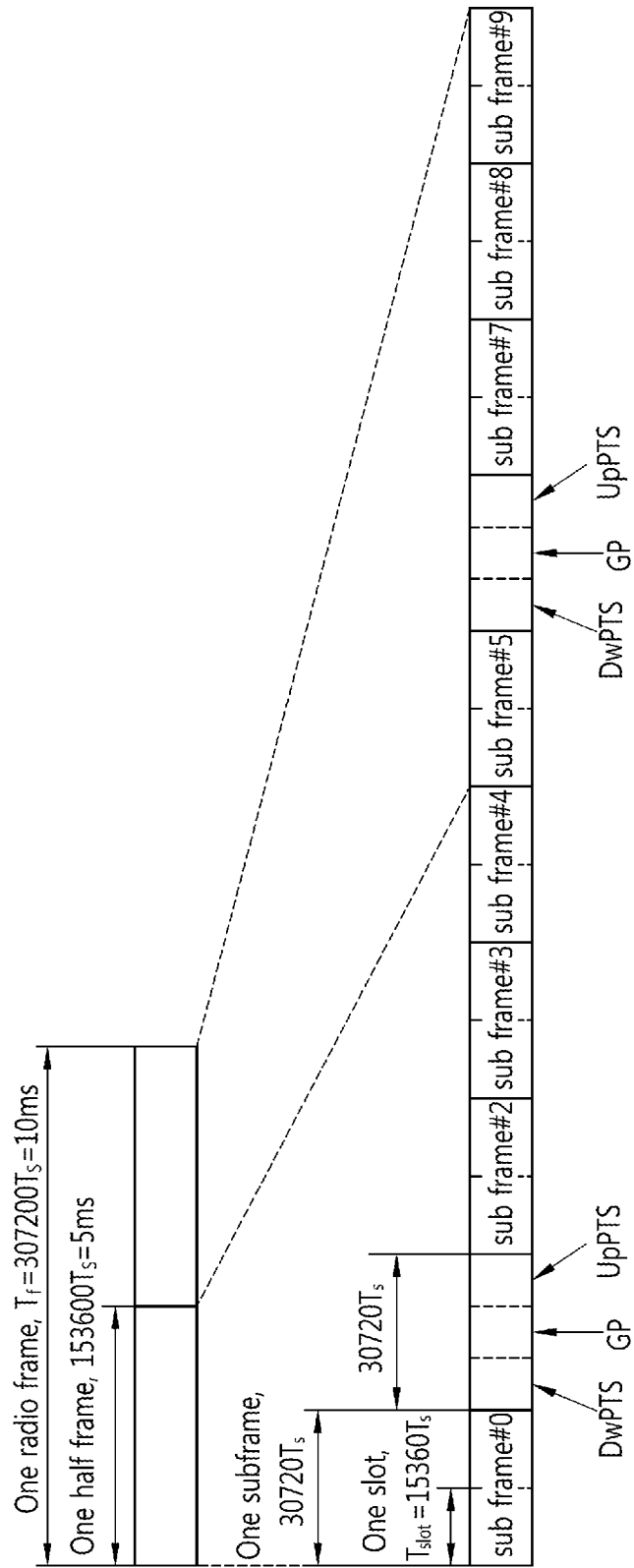
FIG. 2 illustrates a structure of a time division duplex (TDD) radio frame in a 3GPP LTE.

FIG. 2 illustrates a structure of a time division duplex (TDD) radio frame in a 3GPP LTE. A time interval of one radio frame has the relationship of 307200·Ts=10 milli-second(ms).

A downlink (DL) subframe, a Uplink (UL) subframe, and a special subframe (S subframe) may coexist in the TDD radio frame.

Table 1 describes an example of UL-DL configuration of a radio frame.

TABLE 1

| UL = DL configuration | Switch-point periodicity | \multicolumn{10}{c}{Subframe index} | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table 1, the 'D' represents a DL subframe, the 'U' represents an UL subframe, and the 'S' represents a special subframe. If the UL-DL configuration is received from the base station, the UE may know which subframe in the radio frame is a DL subframe or an UL subframe according to the UL-DL configuration.

Meanwhile, when 10 subframes are indexed from 0 to 9 in the radio frame, a subframe having subframe indexes #1 and #6 may include a special subframe. The special subframe includes a Downlink Pilot Time Slot (DwPTS), a Guard Period (GP), and an Uplink Pilot Time Slot (UpPTS). The DwPTS is used for initial cell search, synchronization or channel estimation in the UE. The UpPTS is used for channel estimation in the base station and uplink transmission synchronization of the UE. The GP is an interval to remove interference caused in uplink due to multi-path delay of an uplink signal between uplink and downlink.

Figure 3:
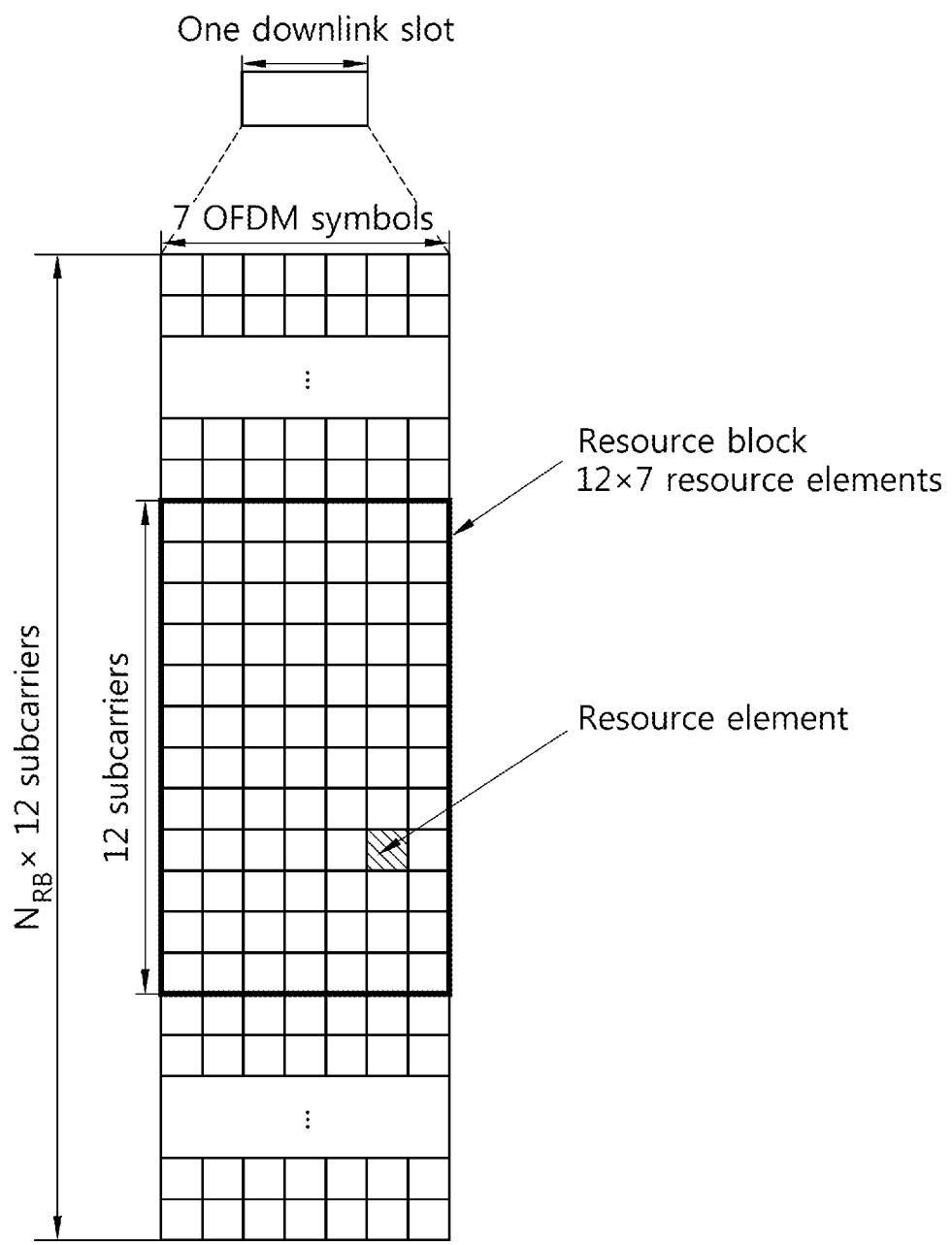
FIG. 3 illustrates an example of a resource grid with respect to one downlink slot.

FIG. 3 illustrates an example of a resource grid with respect to one downlink slot.

Referring to FIG. 3, a downlink slot includes a plurality of OFDM symbols in a time domain and $N_{RB}$ Resource Blocks (RBs) in a frequency domain. The RB includes one slot in the time domain in a resource allocation unit, and a plurality of continuous sub-carriers in a frequency domain. The number $N_{RB}$ of RBs included in the downlink slot depends on a downlink transmission bandwidth set in a cell. For example, the number NRB of RBs in the LTE system may be one of 6 to 110. A structure of the uplink slot may be the same as a structure of the downlink slot.

Meanwhile, each element on the resource grid is a resource element (RE). The resource element on the resource grid may be identified by an index pair (k,l) in a slot. In this case, a k (k=0, . . . , $N_{RB} \times 12-1$) represents a sub-carrier index, and l(l=0, . . . , 6) represents an OFDM symbol index in the slot.

Although FIG. 3 has illustrated that one RB is configured by 7 OFDM symbols in a time domain and 12 sub-carriers in a frequency domain to include 7×12 resource elements, and the number of OFDM symbols and the number of sub-carriers in the RB are not limited thereto. A 1 slot in a normal CP may include 7 OFDM symbols, and a 1 slot in an extended CP may include 6 OFDM symbols. The number of the OFDM symbols and the number of the sub-carriers may be variously changed according to a length of the CP, a frequency spacing, and the like. One of 128, 256, 512, 1024, 1536, and 2048 may be selectively used as the number of sub-carriers in one OFDM symbol.

Figure 4:
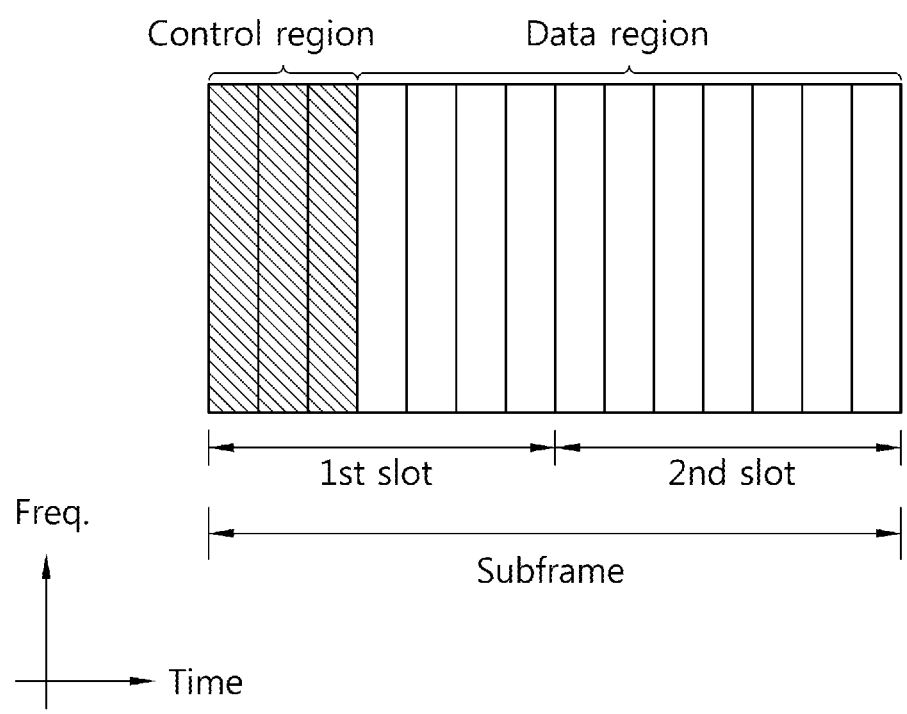
FIG. 4 illustrates a downlink subframe.

FIG. 4 illustrates a downlink subframe.

A downlink (DL) subframe is divided into a control region and a data region in a time region. The control region include maximum 4 OFDM symbols before a first slot in a subframe, but the number of OFDM symbols included in the control region may be changed. A PDCCH (Physical Downlink Control Channel) and other control channel are allocated to the control region, and a PDSCH is allocated to the data region.

As disclosed in 3GPP TS 36.211 V10.2.0, a physical control channel in a 3GPP LTE/LTE-A includes a PDCCH (Physical Downlink Control Channel), a PCFICH (Physical Control Format Indicator Channel), and a PHICH (Physical Hybrid-ARQ Indicator Channel).

A PCFICH transmitted from a first OFDM symbol of the subframe transfers a CFI (control format indicator) regarding the number of OFDM symbols (that is, a size of the control region) used to transmit control channels in the subframe. A wireless device firstly receives a CFI on the PCFICH, and then monitors the PDCCH. Unlike the PDCCH, the PCFICH does not use blind decoding, but is transmitted through a fixed PCFICH resource of the subframe.

The PHICH transfers ACK (acknowledgement)/NACK (not-acknowledgement) signals for uplink (UL) HARQ (hybrid automatic repeat request) process. The ACK/NACK signals regarding UL data on the PUSCH transmitted by the UE are transmitted on the PHICH by the base station.

A PBCH (Physical Broadcast Channel) is transmitted from four OFDM symbols before a second slot of a first subframe of the radio frame. The PBCH transfers essential system information to communicate with the base station, and the system information transmitted through the PBCH refers to MIB (master information block). Meanwhile, system information transmitted on a PDSCH indicated by the PDCCH refers to an SIB (system information block).

Control information transmitted through the PDCCH refers to down link control information (DCI). The DCI may include resource allocation of the PDSCH (refers to DL grant (downlink grant) or DL assignment (DL assignment)), and activation of a set of transmission power control commands and/or VoIP (Voice over Internet Protocol) with respect to individual UEs in a predetermined UE group.

Transmission of a DL transmission block in a 3GPP LTE/LTE-A is performed a pair of the PDCCH and the PDSCH. Transmission of a UL transmission block is performed a pair of the PDCCH and the PDSCH. For example, the wireless device receives a DL transmission block on a PDSCH indicated by the PDCCH. The wireless device monitors the PDCCH in a DL subframe, and receives DL resource assignment on the PDCCH. The radio device receives a DL transmission block on a PDSCH indicated by the DL resource assignment.

The base station determines a PDCCH format according to a DCI to be sent to the wireless device to attach a CRC (Cyclic Redundancy Check) to a DCI, and masks unique identifier (refers to RNTI (Radio Network Temporary Identifier) according an owner or an application the PDCCH to CRC.

In a case of a PDCCH for a specific wireless device, an unique identifier of the wireless device, for example, a C-RNTI (Radio Network Temporary Identifier) may be masked to the CRC. Alternatively, in a case of a PDCCH for a paging message, a paging indication identifier, for example, a P-RNTI (Paging-RNTI) may be masked to the CRC. In a case of a PDCCH for system information, system information identifier, that is, SI-RNTI (system information-RNTI) may be masked to the CRC. In order to indicate a random access response being a response to transmission of the random access preamble, RA-RNTI (random access-RNTI) may be masked to the CRC. So as to indicate a TPC (transmit power control) command with respect to a plurality of wireless devices, TPC-RNTI may be masked to the CRC. In a PDCCH for semi-persistent scheduling (SPS), SPS-C-RNTI may be masked to the CRC. The SPS will be describer later.

If C-RNTI series (for example, C-RNTI, SPS-C-RNTI, Temporary C-RNTI) are used, the PDCCH transfer control information (refers to UE-specific control information) for a corresponding specific wireless device. If other RNTI is used, the PDCCH transfers common control information received by all or a plurality of wireless devices in a cell.

A DCI to which the CRC is added is encoded to generate coded data. Encoding includes channel encoding and rat matching. The coded data are modulated to generate modulated symbols. The modulated symbols are mapped to a physical RE (resource element).

The control region in the subframe includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements (REs). According to the relationship between the number of CCEs and a coding rate provided by the CCEs, a format of the PDCCH and the bit number of possible PDCCHs are determined.

One REG includes four REs, and one CCE includes 9 REGs. In order to configure one PDCCH, {1, 2, 4, 8} CCE may be used. Each element of {1, 2, 4, 8} refers to a CCE aggregation level.

The base station determines the number of CCEs used to transmit the PDDCH is determined according to a channel state. For example, one CCE may be used to transmit the PDCCH in a wireless device having an excellent downlink channel state. 8 CCEs may be used to transmit the PDCCH in a wireless device having a poor downlink channel state.

A control channel configured by one or more CCEs performs interleaving of an REG unit, and is mapped to a physical resource after cyclic shift base a cell ID is performed.

Figure 5:
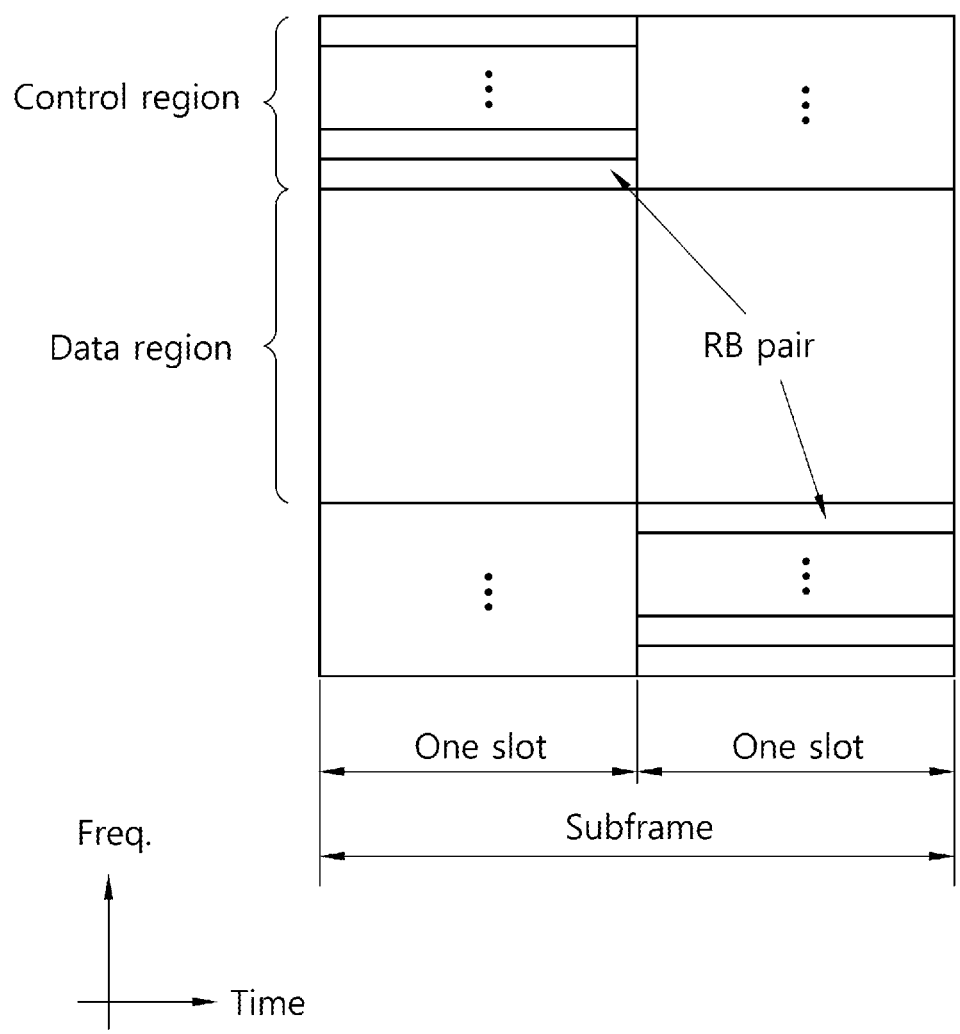
FIG. 5 illustrates a structure of an uplink subframe.

FIG. 5 illustrates an uplink subframe.

Referring to FIG. 5, the uplink subframe may be divided into a control region and a data region in a frequency region. A PUCCH (Physical Uplink Control Channel) for transmitting uplink control information is allocated to the control region. A PUSCH (Physical Uplink Shared Channel) for transmitting data (control information may be transmitted together with the data in some cases) is allocated to the data region. The UE may simultaneously transmit the PUCCH and the PUSCH or may transmit only one of the PUCCH and the PUSCH according to setting.

The PUCCH with respect to one UE is allocated as a RB pair in a subframe. RBs belonging to the RB pair have different sub-carriers in a first slot and a second slot, respectively. A frequency of an RB belonging to the RB pair allocated to the PUCCH is changed based on a slot boundary. This means that a frequency of an RB pair allocated to the PUCCH is hopped in a slot boundary. The uplink control information is transmitted through different sub-carriers according to a time so that a frequency diversity gain may be obtained.

HARQ ACK/NACK (hereinafter simply referred to as 'ACK/NACK' or 'HARQ-ACK), channel status information (CSI) representing a downlink channel state, for example, a CQI (Channel Quality Indicator), a PMI (precoding matrix index), a PTI (precoding type indicator), an RI (rank indication), and the like may be transmitted on the PUCCH.

The CQI provides information on a link adaptive parameter supported from the UE with respect to a given time. The CQI may indicate a data rate which may be supported by a downlink channel by taking a characteristic and an SINR (signal to interference plus noise ratio) of a UE receiver into consideration. The base station may modulation (QPSK, 16-QAM, 64-QAM, and the like) and a coding rate to be applied to downlink channel using a CQI. The CQI may be generated in various schemes. For example, the various schemes include a scheme to quantize and feedback a channel state as it is, a scheme to calculate and feedback the SINR (signal to interference plus noise ratio), and a scheme such as an MCS (Modulation Coding Scheme) to report a really applied state to the channel. When the CQI is generated based on the MCS, the MCS includes a modulation scheme, and a coding scheme, and a coding rate according thereto.

The PMI provides information on a preceding matrix in pre-coding of a code-book base. The PMI is associated with an MIMO (multiple input multiple output). Feedback of the PMI in the MIMO refers to a closed loop MIMO.

An RI is information on a rank (that is, the number of layers) recommended by the UE. That is, the RI represents the number of independent streams used for space multiplexing. Only when the UE is operated in an MIMO mode using the space multiplexing, the RI performs feedback. The RI is always associated with at least one CQI feedback. The feedback CQI is calculated by assuming a specific RI value. In general, since the rank of the channel is changed slower than the CQI, the RI performs feedback less than the feedback number of the CQI. A transmission period of the RI may be a multiple of CQI/PMI transmission period. The RI is given with respect to the whole system band, and a selective frequency RI feedback is not supported.

The PUCCH transfers various types of control information according to a format. The PUCCH format 1 transfers a scheduling request (SR). In this case, an On-Off Keying (OOK) scheme is applicable. A PUCCH format 1 transfers ACK/NACK modulated in a Binary Phase Shift Keying (BPSK) scheme with respect to one code-word. A PUCCH format 1b transfers the ACK/NACK modulated in a Quadrature Phase Shift Keying (QPSK) scheme with respect to two code-words. A PUCCH format 2 transfers a Channel Quality Indicator (CQI) modulated in the QPSK scheme. PUCCH formats 2a and 2b transfer the CQI and the ACK/NACK, respectively.

The PUCCH format may be classified according to a modulation scheme and the number of transmittable bits per subframe. A following table indicates the modulation scheme and the number of bits in the subframe.

TABLE 2

| PUCCH format | Modulation scheme | The number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

All PUCCH formats use cyclic shift (CS) of a shift in each OFDM symbol. The cyclic shifted sequence is generated by cyclically shifting a base sequence by a specific CS amount. A specific CS amount is indicated by a CS index.

An example of defining a base sequence $r_u(n)$ is as follows.

$$r_u(n) = e^{jb(n)\pi/4} \quad \text{[Equation 1]}$$

In the equation 1, the u represents a root index, the n represents an element index and $0 \leq n \leq N-1$, and the N is a length of the base sequence. The b(n) is defined in a section 5.5 of 3GPP TS 36.211 V8.7.0.

The length of the sequence is the same as the number of elements included in the sequence. The u may be defined by a cell ID (identifier) and a slot number in the radio frame. When the base sequence is mapped to one resource block in a frequency domain, since one resource block include 12 sub-carriers, the length of the base sequence is 12. Other base sequence is defined according to other root index.

A cyclic shifted sequence $r(n, I_{cs})$ may be generated by cyclically shifting the root sequence r(n) as follows.

$$r(n, I_{cs}) = r(n) \cdot \exp\left(\frac{j2\pi I_{cs} n}{N}\right), \quad 0 \leq I_{cs} \leq N-1 \quad \text{[Equation 2]}$$

In equation 2, the $I_{cs}$ represents a cyclic shift index ($0 \leq I_{cs} \leq N-1$) indicating a CS amount.

An available cyclic shift index of the base sequence means a cyclic shift index which may be derived from the base sequence according to a CS interval. For example, if the length of the base sequence is 12 and the CS interval is 1, the total number of available cyclic shift indexes of the base sequence is 12. Further, if the length of the base sequence is 12 and the CS interval is 2, the total number of available cyclic shift indexes of the base sequence is 6.

Figure 6:
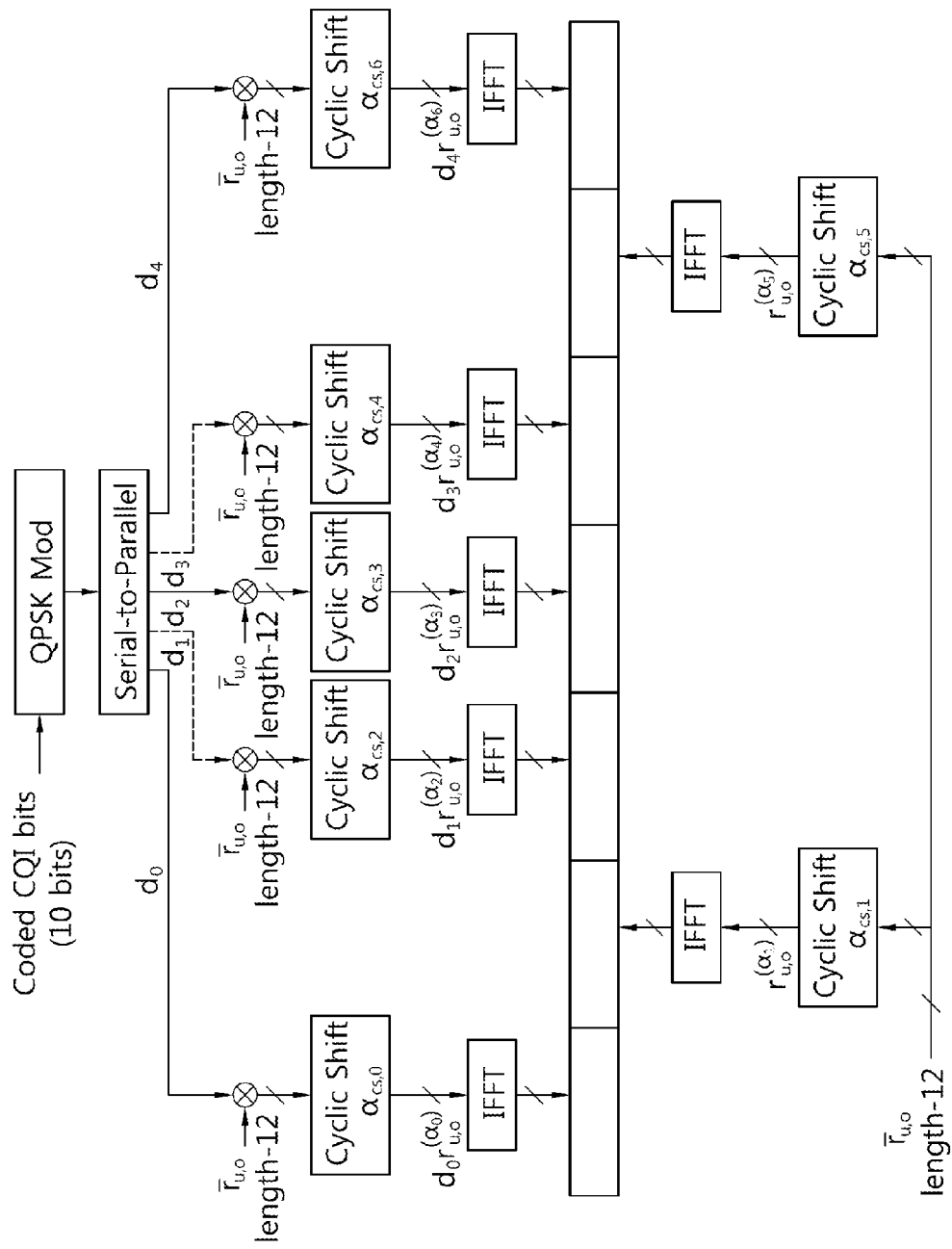
FIG. 6 illustrates a channel structure of a PUCCH format 2/2a/2b with respect to one slot in a normal CP.

FIG. 6 illustrates a channel structure of a PUCCH format 2/2a/2b with respect to one slot in a normal CP. As described above, the PUCCH format 2/2a/2b is used to transmit a CQI.

Referring to FIG. 6, SC-FDMA symbols 1 and 5 are used for a DM RS (demodulation reference symbol) which is a uplink reference signal. In a case of the CP, an SC-FDMA (single carrier-frequency division multiple access) symbol 3 is used for a DM RS 10 CQI information bits are channel-coded with, for example, a 1/2 rate to be 20 coded bits. A Reed-Muller (RM) may be used for the channel coding. Further, after scrambling (PUSCH data is scrambled to a gold sequence having a length 31), a QPSK constellation mapping is performed so that a QPSK modulation symbol is generated ($d_0$ to $d_4$ in a slot 0). After each QPSK modulation symbol is modulated to a cyclic shift of a base RS sequence having a length 12 and is OFDM-modulated, 10 SC-FDMA symbols in a subframe are transmitted. 12 uniformly spaced cyclic shifts may be multiplexed so that different UEs are orthogonal to each other in the same PUCCH resource block. A DM RS sequence applied to the SC-FDMA symbols 1 and 5 may use a base RS sequence having a length 12.

Figure 7:
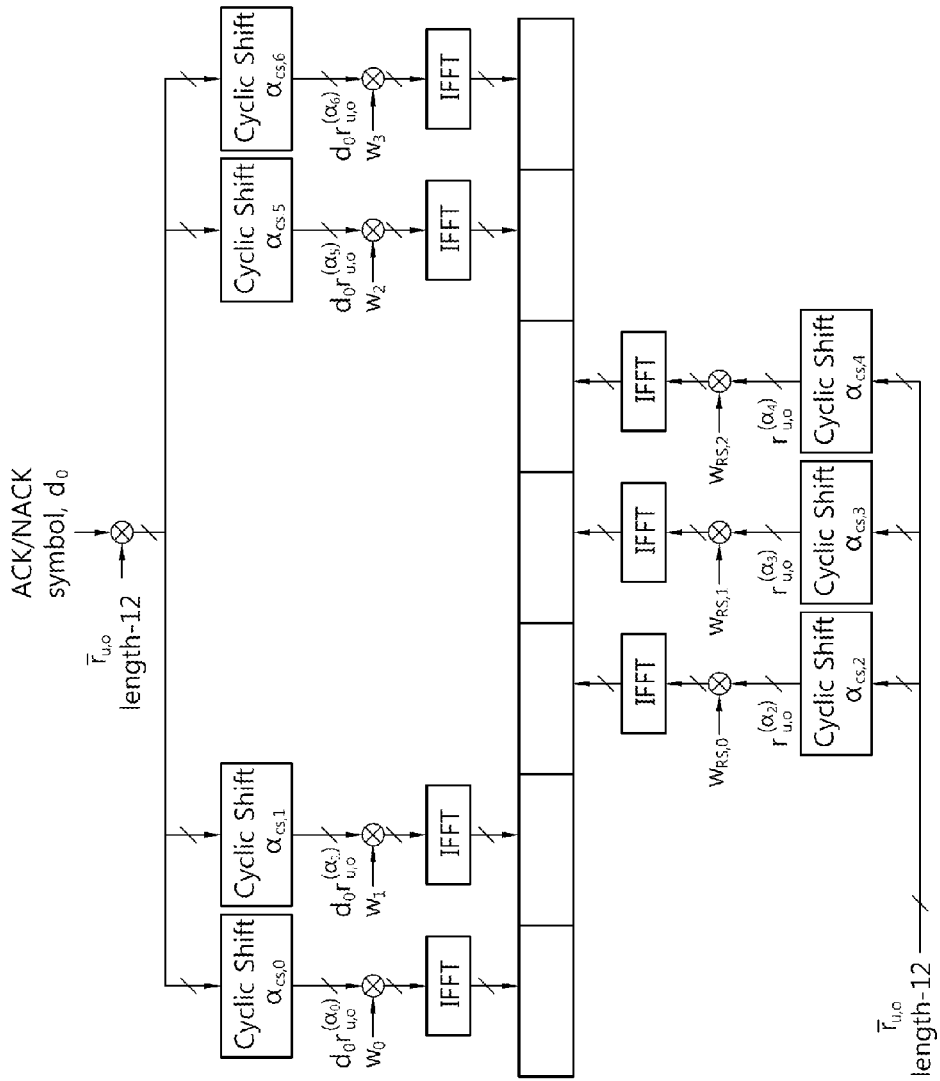
FIG. 7 illustrates a PUCCH format 1a/1b with respect to one slot in a normal CP.

FIG. 7 illustrates a PUCCH format 1a/1b with respect to one slot in a normal CP. A uplink reference signal is transmitted in third to fifth SC-FDMA symbols. In FIG. 7, after IFFT (Inverse Fast Fourier Transform) for $w_0$, $w_1$, $w_2$, and $w_3$ is performed, the $w_0$, $w_1$, $w_2$, and $w_3$ may be modulated in a time domain and may be modulated in a frequency domain before IFFT modulation.

One symbol includes seven OFDM symbols, 3 OFDM symbols become an RS (Reference Signal) OFDM symbol for a reference signal, and 4 OFDM symbols become a data OFDM symbol for ACK/NACK signals.

In a PUCCH format 1b, encoded 2 bit ACK/NACK signals are QPSK (Quadrature Phase Shift Keying)-modulated so that a modulation symbol d(0) is generated.

A cyclic shift index $I_{cs}$ may be changed according to a slot number $n_s$ in a radio frame and/or a symbol index 1 in a slot.

Since there are 4 data OFDM symbols to transmit ACK/NACK signals to one slot in a normal CP, it is assumed that cyclic shift indexes corresponding to each data OFDM symbol are $I_{cs0}$, $I_{cs1}$, $I_{cs2}$, and $I_{cs3}$.

A modulation symbol d(0) is extended to a cyclic shifted sequence $r(n, I_{cs})$. If one dimensional spread sequence corresponding to an (i+1)-th OFDM symbol in the slot is m(i), {m(0), m(1), m(2), m(3)}={d(0)r(n,$I_{cs0}$), d(0)r(n,$I_{cs1}$), d(0)r(n,$I_{cs2}$), d(0)r(n,$I_{cs3}$)}, In order to increase a capacity of the UE, the one dimensional spread sequence may be spread using an orthogonal sequence. An orthogonal sequence $w_i(k)$ (I represents a sequence index, $0 \leq k \leq K-1$) having spreading factor K=4 uses a following sequence.

TABLE 3

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (I represents a sequence index, $0 \leq k \leq K-1$) having spreading factor K=3 uses a following sequence.

TABLE 4

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

Different spreading coefficients may be used according to the slot.

Accordingly, when an optional orthogonal sequence index i is given, two dimensional spread sequences {s(0), s(1), s(2), s(3)} may be expressed as follows.

{s(0), s(1), s(2), s(3)}={$w_i(0)$m(0), $w_i(1)$m(1), $w_i(2)$m(2), $w_i(3)$m(3)}

After an IFFT for the two dimensional sequences {s(0), s(1), s(2), s(3)} is performed, the sequences are transmitted in a corresponding OFDM symbol. Accordingly, the ACK/NACK signals are transmitted on a PUCCH.

A reference signal of a PUCCH format 1b is spread and transmitted as an orthogonal sequence after cyclically shifting the base sequence r(n). If cyclic shift indexes corresponding to three RS OFDM symbols are $I_{cs4}$, $I_{cs5}$, and $I_{cs6}$, three cyclic shifted sequences $r(n,I_{cs4})$, $r(n,I_{cs5})$, $r(n,I_{cs6})$ may be obtained. The three cyclic shifted sequence are spread to an orthogonal sequence $w_{RS,i}(k)$ of K=3.

The orthogonal sequence index i, the cyclic shift index $I_{cs}$ and the resource block index m may include a parameter necessary to configure the PUCCH and a resource used to identify the PUCCH (or UE). If the number of available cyclic shifts is 12 and the number of available orthogonal sequence indexes is 3, a PUCCH with respect to 36 UEs may be multiplexed to one resource block.

In the 3GPP LTE, $n^{(1)}_{PUCCH}$ is defined when the UE acquires three parameters to configure the PUCCH. A resource index is defined as $n^{(1)}_{PUCCH}=n_{CCE}+N^{(1)}_{PUCCH}$. The $n_{CCE}$ represents an index of a first CCE (CCE having the lowest index) used to transmit a corresponding DCI (that is, downlink resource allocation to receive downlink data being a target of the ACK/NACK signals), and $N^{(1)}_{PUCCH}$ represents where the base station reports to the UE as a upper layer message.

Hereinafter, a time, a frequency, and a code resource used to transmit the ACK/NACK signals refer to ACK/NACK resources or PUCCH resources. As described above, an index to determine the PUCCH resource (refer to PUCCH index), that is, an index necessary to transmit ACK/NACK signals on a PUCCH may be expressed by at least one of {orthogonal sequence index i, cyclic shift index $I_{cs}$, resource block index m} or an index ($n^{(1)}_{PUCCH}$) to obtain the three indexes. That is, the PUCCH resource may include at least one of an orthogonal sequence, a cyclic shift, a resource block, and a combination thereof. The index indicating the PUCCH resource may refer to a PUCCH index.

Meanwhile, in an LTE-A, a PUCCH format 3 is introduced to transmit uplink control information (for example, ACK/NACK and SR) of maximum 21 bits (the number of bits before channel coding as information bit, maximum 22 bits when an SR is included). The PUCCH format 3 uses a QPSK in a modulation scheme, and the number of transmittable bits in a subframe is 48 bits).

The PUCCH format 3 performs block spreading based transmission. A modulation symbol sequence obtained by modulating a multi-bit ACK/NACK using a block spreading code.

Figure 8:
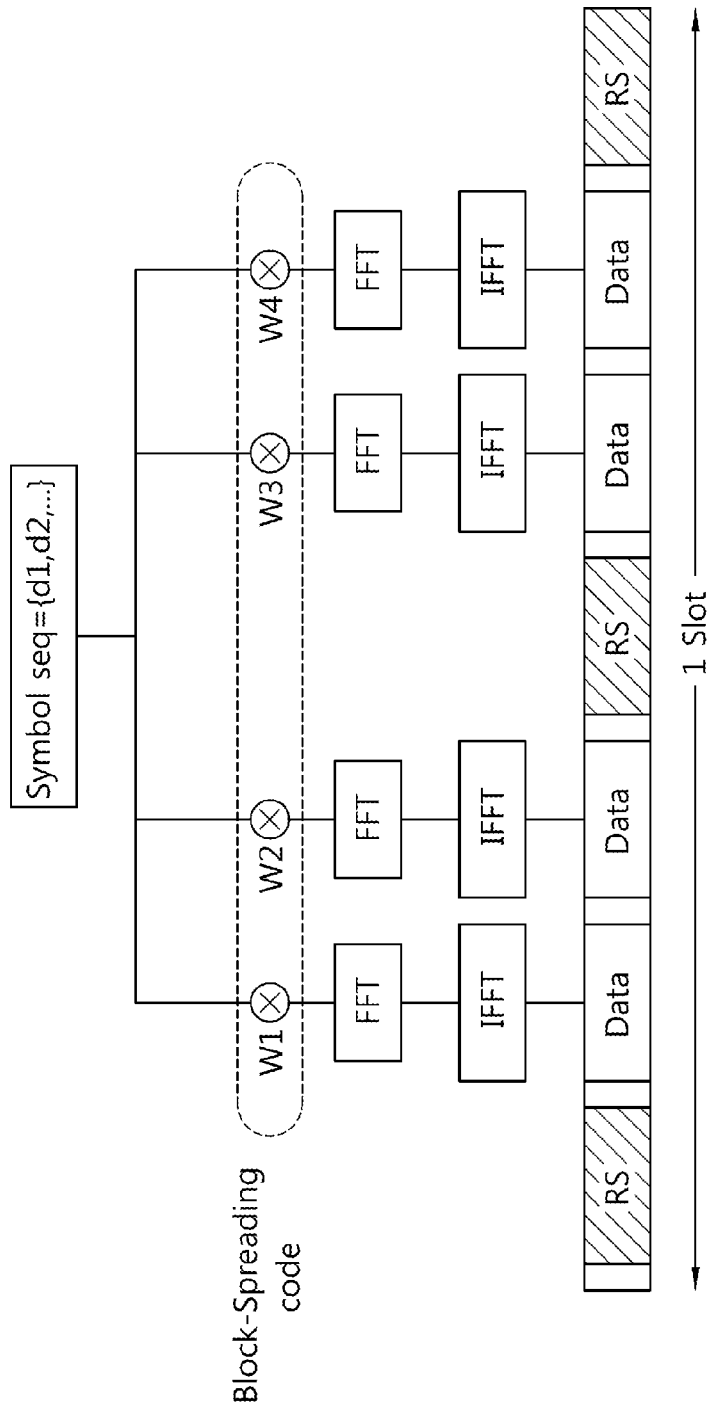
FIG. 8 illustrates a channel structure of a PUCCH format 3.

FIG. 8 illustrates a channel structure of a PUCCH format 3.

Referring to FIG. 8, a block spreading code is applied to a modulation symbol sequence {d1, d2, ... } and is spread in a time domain. The block spreading code may include an orthogonal cover code (OCC). In this case, in the modulation symbol sequence, ACK/NACK information bits are channel-coded (using RM code, TBCC, punctured RM code) so that ACK/NACK coded bits are generated, the ACK/NACK coded bits are a sequence of modulated (for example, QPSK) symbols. The sequence of the modulation symbols is mapped to data symbols of a slot through FFT (fast Fourier transform) and IFFT (inverse fast Fourier transform) to be transmitted. Although FIG. 8 illustrates that three RS symbols are included in one slot, two RS symbol may exist. In this case, a block spreading code of a length 5 may be used.

<Semi-Persistent Scheduling: SPS>

In the wireless communication system, the UE receives scheduling information such as DL grant and UL grant through a PDCCH to perform an operation of transmitting the PUSCH. In general, the DL grant and the PDSCH are received in the same subframe. Further, in a case of the FDD, the PUSCH is transmitted after fourth subframes from a subframe receiving the UL grant. An LTE except for the dynamic scheduling provides semi-persistent scheduling (SPS).

Downlink or uplink SPS may report by which subframe semi-static transmission (PUSCH)/reception (PDSCH) is performed to the UE through an upper layer signal. For example, a parameter give as the upper layer signal may be a period and an offset value of the subframe.

The UE recognizes SPS transmission/reception through RRC signaling. If receiving activation and release signal of SPS transmission through the PDCCH, the UE performs or releases SPS transmission/reception. That is, although an SPS is allocated through RRC signaling, when SPS transmission/reception are not performed but the activation or release signal is received through the PDCCH, frequency resource (resource block) according to a resource block allocation designated in the PDCCH and modulation and a coding rate according to MCS information are applied so that SPS transmission/reception are performed in a subframe corresponding to a subframe period and an offset value allocated through RRC signaling. If an SPS release signal is received through the PDSSH, SPS transmission/reception stop. If a PDCCH (SPS reactivation PDCCH) including an SPS activation signal is again received, the stopped SPS transmission/reception restarts using a frequency resource and an MCS designated by a corresponding PDCCH.

Hereinafter, a PDCCH for SPS activation refers to an SPS activation PDCCH, and a PDCCH for SPS release refers to an SPS release PDCCH. The UE may validate whether the PDCCH is SPS activation/release PDCCH when following conditions are satisfied. 1. CRC parity bits obtained from a PDCCH payload are scrambled to SPS C-RNTI, and 2. A value of new data indicator field should be '0'. Further, if each filed value included in the PDCCH is set as values of a following table, the UE recognizes that downlink control information (DCI) of a corresponding PDCCH is SPS activation or release.

TABLE 5

|  | DCI format 0 | DCI format 1/1A | DCI format 2/2A/2B |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

The table 5 indicates a filed value of an SPS activation PDCCH to validate SPS activation.

TABLE 6

|  | DCI format 0 | DCI format 1A |
| --- | --- | --- |
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

The table 6 indicates a field value of an SPS release PDCCH to validate the SPS release.

By the SPS, a PDCCH indicating an SPS activation and a PDSCH transmitted from the same subframe has a corresponding PDCCH (that is, PDCCH indicating SPS activation), a next PDSCH, that is, by the SPS, a next scheduled PDSCH (refer to SPS PDSCH) does not have a corresponding PDCCH. Accordingly, when transmitting ACK/NACK with respect to the SPS PDSCH, it is impossible to use a PUCCH resource mapped to the lowest CCE index of the PDCCH.

Accordingly, the base station previously sets a plurality of resources through an upper layer signal like an RRC message, and then exclusively uses a TPC field included in a PDCCH indicating SPS activation as an ARI (ACK/NACK resource indicator) to indicate ACK/NACK transmission resources with respect to SPS PDSCH in a scheme of indicating a specific resource among a plurality of resources. Such ACK/NACK transmission resources may refer to an explicit resource.

<HARQ (Hybrid Automatic Repeat Request)>

Upon transmission/reception of data between the base station and the UE, when the frame is not received or damaged, an error control method includes an ARQ (Automatic Repeat request) scheme and a HARQ (hybrid ARQ) scheme which is a developed scheme thereof. In the ARQ scheme, after one frame is transmitted, a confirmation message ACK is waited for. Only when a reception side exactly receives the frame, the reception side sends the confirmation message ACK. When an error occurs in the frame, the reception side sends a NACK (negative-ACK) message, and a reception frame with the error removes the information in a receiving end buffer. When the transmission side receives the ACK signal, the transmission side transmits a next frame. When receive the NACK message, the transmission side retransmits the frame.

Unlike the ARQ scheme, according to the HARQ scheme, when the received frame cannot be demodulated, a receiving end transmits an NACK message to the transmitting end. However, when the received frame is stored in the buffer for a predetermined time so that the frame is retransmitted, the frame is coupled with the received frame so that a reception success rate is increased.

In recent years, more efficient HARQ scheme than the ARQ scheme may be widely used. There are various types of HARQ schemes. The HARQ scheme may be divided into synchronous HARQ and asynchronous HARQ according to retransmission timing. The HARQ scheme may be divided into a channel-adaptive scheme and a channel-non-adaptive scheme according to presence of reflection of a channel state with respect to an amount of a resource used upon retransmission.

Figure 9:
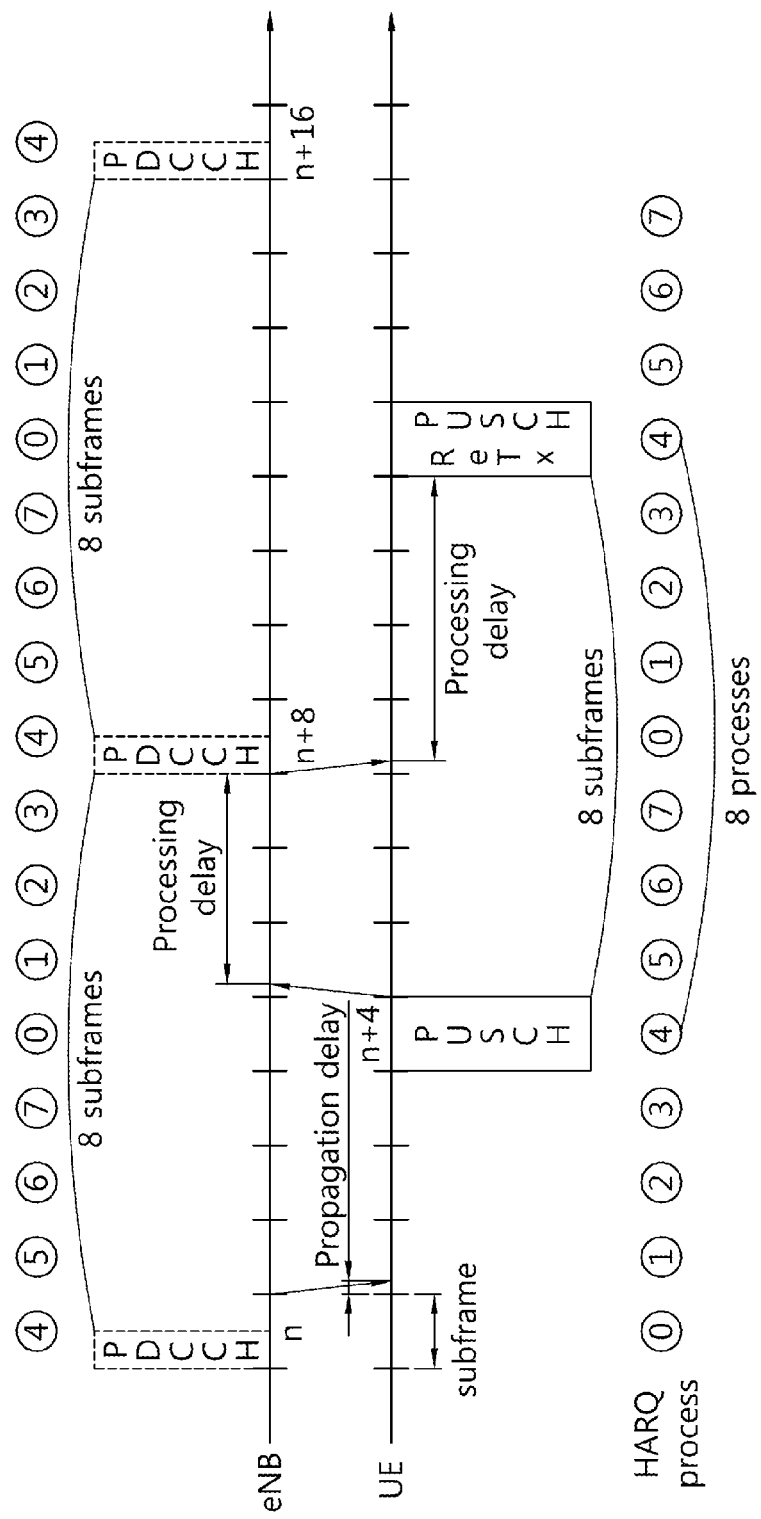
FIG. 9 illustrates a synchronization HARQ.

FIG. 9 illustrates a synchronization HARQ.

The synchronization HARQ is a scheme where next retransmission is achieved at preset timing by a system. That is, if it is assumed that the time of the retransmission is achieved an 8-th time unit after initial transmission, since the engagement is achieved between the base station and the UE, it is not necessary to additionally report the timing. However, if the data transmission side receives an NACK message, data are transmitted in every 8-th time unit in order to receive the ACK message.

Meanwhile, retransmission timing of the asynchronization HARQ scheme is newly scheduled or the asynchronization HARQ scheme may be achieved through additional signaling. Retransmission timing with respect to data in which transmission previously fails is changed due to various factors such as a channel state.

A channel adaptive HARQ scheme is a scheme where modulation of data, the number of resource blocks, and a coding scheme upon retransmission are achieved in an order determined in initial transmission. Meanwhile, in the channel adaptive HARQ scheme is a scheme where the modulation of data, the number of resource blocks, and a coding scheme are changed according to a state of the channel.

For example, the transmission side transmits data using 6 resource blocks upon initial transmission. Next, a scheme of equally retransmitting the data using 6 resource blocks is a channel non-adaptive HARQ scheme.

Meanwhile, a scheme of retransmitting data using resource blocks greater or less than 6 according to a channel state although the data are initially transmitted using 6 resource blocks.

Four types of HARQs may be combined through the above classification. A widely used HARG scheme includes asynchronization and channel adaptive HARG scheme and synchronization and channel non-adpative HARQ scheme. Since the asynchronization and channel adaptive HARG scheme may maximize retransmission efficiency by adaptively changing retransmission timing and an amount of a resource but overhead is increased, the asynchronization and channel adaptive HARG scheme is not generally considered for uplink. Meanwhile, since the synchronization and channel adaptive HARQ does not substantially have overhead because timing and resource allocation for retransmission are engaged in the system, overhead is rare, but retransmission efficiency is very lower in a channel state having great variation.

In downlink in a current 3GPP LTE, the asynchronization HARG scheme is used. In uplink case, the synchronization HARG scheme is used.

Meanwhile, in the downlink, until ACK/NACK signals are received from the UE and data are transmitted after scheduling is performed and the data are transmitted, as shown in FIG. 9, time delay occurs. This is a delay due to a time required for transfer delay of a channel, data decoding and data encoding. In order to transmit blank free data during the delay interval, a transmitting scheme using an independent HARG process is used.

For example, if the shortest period between next data transmission and next data transmission is 8 subframe, 8 independent processes are performed so that data may be transmitted without blank. When the MIMO is not performed in the LTE FDD, maximum 8 HARG processes may be allocated.

<Carrier Aggregation>

Hereinafter, the carrier aggregation system will be described.

Figure 10:
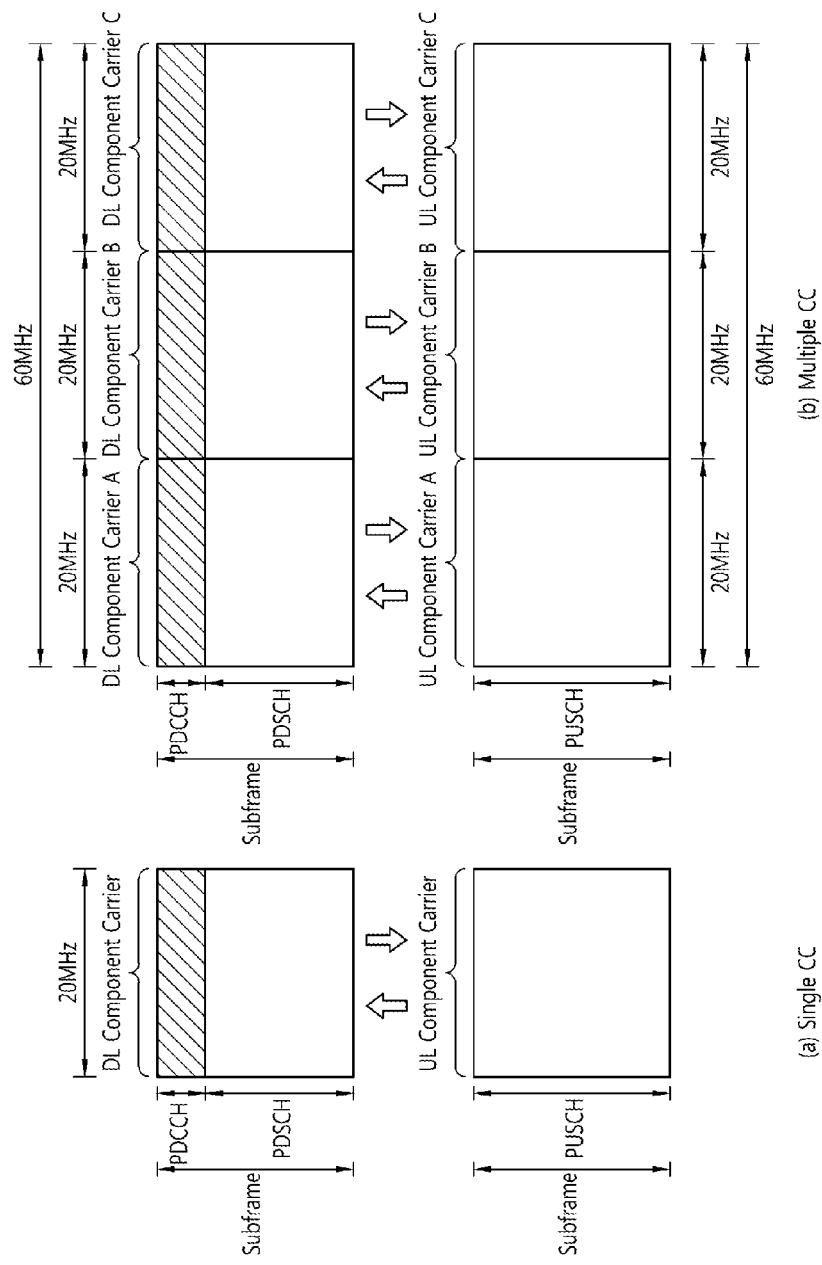
FIG. 10 illustrates an example of comparing an existing single carrier system and a carrier aggregation system.

FIG. 10 illustrates an example of comparing an existing single carrier system and a carrier aggregation system.

Referring to FIG. 10, in a single carrier system, only one carrier is supported to the UE in uplink and downlink. Although there may be various bandwidths of the carrier, one carrier is allocated to the UE. Meanwhile, in the CA system, a plurality of component carriers (DL CC A to C, UL CC A to C). The component carrier (CC) means a carrier used for the CA system and may refer to a carrier. For example, in order to allocate a bandwidth of 60 MHz to the UE, 3 component carriers of 20 MHz may be allocated.

The CA system may be classified into a continuous CA system where aggregated carriers continue and a non-continuous CA system where the aggregated carriers are spaced apart from each other. Hereinafter, it is understood that the CA system includes all of a case of a continuous component carrier and a case of a non-continuous component carrier.

A system frequency band of the wireless communication system is classified into a plurality of carrier-frequencies. The carrier frequency means a center frequency of a cell. Hereinafter, the cell may mean a downlink frequency resource and an uplink frequency resource. Alternatively, the cell may mean a combination of the downlink frequency resource and an optional uplink frequency resource. Further, generally, when the CA is not considered, one cell may include a pair of uplink and downlink frequency resources.

In order to transmit/receive packet data through the specific cell, the UE should finish configuration with specific cell. In this case, the configuration means a state of finishing reception of system information necessary to transmit/receive data with respect to a corresponding cell. For example, the configuration may include the whole procedure to receive common physical layer parameters necessary to transmit/receive data, or MAC (media access control) layer parameters, or parameters necessary for a specific operation at an RRC layer. If a cell in which the configuration is terminated receives only information indicating that packet data may be transmitted, the cell may transmit and receive a packet at once.

The cell in which the configuration is terminated may be in an activation state or a deactivation state. In this case, the activation means that data are transmitted or received or transmission or reception of the data in a ready state. The UE may monitor or receive a control channel PDCCH and a data channel PDSCH of an activated cell in order to confirm resources (frequency, time, or the like) allocated to the UE.

The deactivation means that transmission or reception of traffic data is impossible and measurement or transmission/reception of minimum information is possible. The UE may receive system information SI necessary to receive a packet from a deactivated cell. Meanwhile, the UE does not monitor or receive a control channel PDCCH and a data channel PDSCH of the deactivated cell in order to confirm resources (frequency, time, or the like).

The cell may be classified into a primary cell, a secondary cell, and a serving cell.

The primary cell means a cell operating at a primary frequency, and means a cell performing initial connection establishment procedure or connection reestablishment procedure with the base station or a cell indicated as a primary cell at a handover procedure.

The secondary cell means a cell operating in a secondary cell. If RRC connection is established, the secondary cell is used to provide an additional preset wireless resource.

In a case of UE in which the CA is not set or does not provide the CA, the serving cell is configured by the primary cell. When the carrier aggregation is set, the term 'serving cell' represents a cell set to the UE and a plurality of serving cell may be configured. One serving cell may be configured by one downlink component carrier or a pair of {downlink component carrier, uplink component carrier}. A plurality of serving cells may be configured by a primary cell and one secondary cell or a plurality of secondary cells.

A PCC (primary component carrier) signifies a component carrier (CC) corresponding to a primary cell. The PCC is a CC where the UE initially achieves connection or RRC connection with the base station among a plurality of CCs. The PCC is a special CC to provide connection or RRC connection for signaling regarding a plurality of CC, and to manage UE context which is connection information associated with the UE. Further, when the PCC accesses the UE in an RRC connection mode, the PCC is always in an active state. A downlink component carrier corresponding to the primary cell refers to a DownLink Primary Component Carrier (DL PCC) and an uplink component carrier corresponding to the primary cell refers to an uplink primary component carrier (UL PCC).

The SCC (secondary component carrier) means a CC corresponding to the secondary cell. That is, the SCC is a CC allocated to the UE except for a PCC. The SCC is an extended carrier when the UE selects for additional resource allocation except for the PCC, and may be divided into a activation state or a deactivation state. A downlink component carrier corresponding to the secondary cell refers to a DownLink secondary Component Carrier (DL SCC) and an uplink component carrier corresponding to the second cell refers to an uplink secondary component carrier (UL SCC).

The primary cell and the secondary cell have following characteristics.

First, the primary cell is used to transmit the PUCCH. Second, the primary cell is always activated, but the second cell is a carrier which is activated/deactivated according to a specific condition. Third, when the primary cell experiences a Radio Link Failure (hereinafter referred to as 'RLF'). Fourth, the primary cell may be changed according to variation in a security key, a RACH (Random Access CHannel) procedure, and an accompanying handover procedure. Fifth, NAS (non-access stratum) information is received through the primary cell. Sixth, in a case of an FDD system, the primary cell always configures a pair of the DL PCC and the UL PCC. Seventh, different component carriers CCs may be set as the primary cell every UE. Eighth, the primary cell may be replaced by only handover, cell selection/cell reselection procedures. In addition of a new secondary cell, RRC signal may be used to transmit system information of a dedicated secondary cell.

In a component carrier configuring the serving cell, the downlink component carrier may configure one serving cell, or the downlink component carrier and the uplink component carrier are connected and configured so that one serving cell may be configured. However, the serving cell may not be configured by only one uplink component carrier.

Activation/deactivation of the component carrier is similar to concept of activation/deactivation of the serving cell. For example, activation of the serving cell 1 means activation of the DL CC1 on the assumption that the serving cell 1 is configured by a DL CC1. If the activation of the serving cell 2 means activation of a DL CC2 and the UL CC2 on the assumption that the serving cell 2 is configured by connecting and configuring a DL CC2 and a UL CC2. In this meaning, each component carrier may correspond to a serving cell.

The number of component carriers aggregated between downlink and uplink may be differently set. When the number of CCs in the downlink is the same as the number of CCs in the uplink, the aggregation is symmetric. When the number of CCs in the downlink is different from the number of CCs in the uplink, the aggregation is asymmetric. Further, the sizes (that is, bandwidths) of the CCs may be different from each other. For example, when five CCs is used to configure 70 MHz band, 5 MHz CC (carrier #0)+20 MHz CC (carrier #1)+20 MHz CC (carrier #2)+20 MHz CC (carrier #3)+5 MHz CC (carrier #4) may be configured.

As described above, the CA system may support a plurality of CCs, that is, a plurality of serving cells unlike the single carrier system.

Such a CA system may support cross-carrier scheduling. The cross-carrier scheduling is a scheduling method capable of performing resource allocation of a PDSCH transmitted through a different component carrier through a PDCCH transmitted through a specific component carrier and/or resource allocation of a PUSCH transmitted through other component carrier except for a component carrier fundamentally linked with the specific component carrier. That is, the PDCCH and the PDSCH may be transmitted through different DL CCs, a PUSCH may be transmitted through a UL CC different from a UL CC liked with a DL CC to which a PDCCH including an UL is transmitted. As described above, in a system for supporting the cross-carrier scheduling, the PDCCH needs a carrier indicator indicating that PDSCH/PUSCH are transmitted through a certain DL CC/UL CC. Hereinafter, a field including the carrier indicator refers to a carrier indication field (CIF).

A CA system to support the cross-carrier scheduling may include a carrier indicator field (CIF) included in a DCI (downlink control information) format according to the related art. In the system to support the cross-carrier scheduling, for example, an LTE-A system, since a CIF is added to an existing DCI format (that is, a DCI format used in an LTE), 3 bits may be spread, and a PDCCH structure may reuse an existing coding method, a resource allocation method (that is, a CCE based resource mapping).

The base station may set a PDCCH monitoring DL CC (monitoring CC) group. The PDCCH monitoring DL CC group is configured by a part of all aggregated DL CCs. If the cross-carrier scheduling is configured, the UE performs PDCCH monitoring/decoding for only a DL CC included in the PDCCH monitoring DL CC group. That is, the base station transmits a PDCCH with respect to PDSCH/PUSCH to be scheduled through only the DL CCs included in the PDCCH monitoring DL CC group. The PDCCH monitoring DL CC group may be configured to UE-specific, UE group-specific, or cell-specific.

<Method of Transmitting ACK/NACK in an HARQ Process>

Hereinafter, ACK/NACK transmission for HARQ in 3GPP LTE is described.

In frequency division duplex (FDD), when two serving cells are configured, a UE which supports an aggregation of up to two serving cells transmits ACK/NACK by using a PUCCH format 1b with channel selection.

When at least two serving cells are configured, a UE which supports an aggregation of at least three serving cells transmits ACK/NACK using the PUCCH format 1b or the PUCCH format 3 with channel selection according to a configuration of a higher layer signal. The PUCCH format 1b with channel selection will be described below.

Unlike the FDD, DL subframes and UL subframes coexist in TDD. Generally, the number of the UL subframes is less than the number of DL subframes. Accordingly, in preparation for a case where UL subframes are insufficient to transmit an ACK/NACK signal, it is supported to transmit a plurality of ACK/NACK signals in one UL subframe with respect to transport blocks (or a plurality of PDSCHs) received in a plurality of DL subframes. Regarding a UL subframe for transmitting ACK/NACK and one or more DL subframes capable of transmitting a transport block (or PDSCH) which is a target of the ACK/NACK, it can be expressed that the one or more DL subframes are matched (related/associated) with subframes for transmitting the ACK/NACK.

In TDD, a UE which does not support at least two serving cells supports two types of ACK/NACK modes, i.e., bundling and channel selection, according to a higher layer configuration.

First, the bundling is an operation in which, if all of PDSCHs (i.e., DL transport blocks) received by the UE are successfully decoded, ACK is transmitted, and otherwise NACK is transmitted. This is called an AND operation. However, the bundling is not limited to the AND operation, and may include various operations for compressing ACK/NACK bits corresponding to a plurality of transport blocks (or codewords). For example, the bundling may indicate a value for counting the number of ACK (or NACK) responses or the number of consecutive ACK responses. The bundling may be expressed as ACK/NACK bundling.

Second, the channel selection is also called ACK/NACK multiplexing. In the channel selection, the UE transmits the ACK/NACK by selecting one of a plurality of PUCCH resources.

The following table shows an example of a DL subframe n-k associated with a UL subframe n according to a UL-DL configuration in 3GPP LTE TDD. Herein, k∈K, and M represents the number of elements of a set K.

TABLE 7

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Assume that M DL subframes are associated with a UL subframe n, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. An example of channel selection is shown in the following table.

TABLE 8

| HARQ-ACK(0), HARQ-ACK(1), HARQ-ACK(2) | $n^{(1)}_{PUCCH}$ | b(0), b(1) |
|---|---|---|
| ACK, ACK, ACK | $n^{(1)}_{PUCCH,2}$ | 1, 1 |
| ACK, ACK, NACK/DTX | $n^{(1)}_{PUCCH,1}$ | 1, 1 |
| ACK, NACK/DTX, ACK | $n^{(1)}_{PUCCH,0}$ | 1, 1 |

TABLE 8-continued

| HARQ-ACK(0), HARQ-ACK(1), HARQ-ACK(2) | $n_{PUCCH}^{(1)}$ | b(0), b(1) |
|---|---|---|
| ACK, NACK/DTX, NACK/DTX | $n_{PUCCH,0}^{(1)}$ | 0, 1 |
| NACK/DTX, ACK, ACK | $n_{PUCCH,2}^{(1)}$ | 1, 0 |
| NACK/DTX, ACK, NACK/DTX | $n_{PUCCH,1}^{(1)}$ | 0, 0 |
| NACK/DTX, NACK/DTX, ACK | $n_{PUCCH,2}^{(1)}$ | 0, 0 |
| DTX, DTX, NACK | $n_{PUCCH,2}^{(1)}$ | 0, 1 |
| DTX, NACK, NACK/DTX | $n_{PUCCH,1}^{(1)}$ | 1, 0 |
| NACK, NACK/DTX, NACK/DTX | $n_{PUCCH,0}^{(1)}$ | 1, 0 |
| DTX, DTX, DTX | | No transmission |

In the above table, HARQ-ACK(i) denotes ACK/NACK for an $i^{th}$ DL subframe among the M DL subframes. Discontinuous transmission (DTX) implies that a DL transport block cannot be received on a PDSCH in a corresponding DL subframe or that a corresponding PDCCH cannot be detected. In Table 8 above, there are three PUCCH resources $n^{(1)}_{PUCCH,0}$, $n^{(1)}_{PUCCH,1}$, and $n^{(1)}_{PUCCH,2}$, and b(0) and b(1) are 2 bits transmitted by using a selected PUCCH.

For example, if the UE successfully receives all of the three DL transport blocks in three DL subframes, the UE performs QPSK modulation on bits (1,1) by using $n^{(1)}_{PUCCH,2}$ and transmit the modulated bits through the PUCCH. If the UE fails to decode the DL transport block and successfully decodes the remaining transport blocks in a $1^{st}$ (i=0) DL subframe, the UE transmits bits (0, 1) by using $n^{(1)}_{PUCCH,2}$ through the PUCCH.

In the channel selection, NACK and DTX are coupled if at least one ACK exists. This is because a combination of a reserved PUCCH resource and a QPSK symbol is not enough to express all ACK/NACK/DTX states. However, if the ACK does not exist, the DTX and the NACK are decoupled.

The conventional PUCCH format 1b can transmit only 2-bit ACK/NACK. However, the PUCCH format 1b with channel selection represents more ACK/NACK states by linking a combination of allocated PUCCH resources and a modulation symbol (2 bits) to a plurality of ACK/NACK states.

Meanwhile, if it is assumed that M DL subframes are associated with a UL subframe n, ACK/NACK may be mismatched between a BS and a UE due to missing of the DL subframe (or PDCCH).

Assume that M=3, and the BS transmits three DL transport blocks through three DL subframes. The UE misses the PDCCH in the second DL subframe and thus cannot receive a second transport block at all, and can receive only the remaining first and third transport blocks. In this case, if ACK/NACK bundling is used, the UE erroneously transmits ACK.

In order to solve this error, a downlink assignment index (DAI) is included in a DL grant on the PDCCH. The DAI indicates an accumulative counter value of the PDCCH which transmits a PDSCH allocated thereto. A value of the 2-bit DAI is increased in an orderly manner starting from 1, and a modulo-4 operation is applicable again starting from DAI=4. If M=5 and all of 5 DL subframes are scheduled, the DAI can be included in a corresponding PDCCH in the order of DAI=1, 2, 3, 4, 1.

In TDD, when a UL-DL configuration 5 is selected and the UE does not support an aggregation of at least two serving cells, only bundling is supported.

In case of the UE which supports the aggregation of at least two serving cells, if at least two serving cells are configured, the UE transmits ACK/NACK by using one of a PUCCH format 1b with channel selection or a PUCCH format 3 according to a higher layer configuration.

Even if the UE which supports at least two serving cells is configured to use bundling according to a higher layer signal and one serving cell is configured in TDD, the UE may transmit ACK/NACK by using one of the PUCCH format 1b with channel selection or the PUCCH format 3 according to the higher layer configuration.

If ACK/NACK for at least two serving cells is transmitted through a PUCCH format 1b with channel selection, mapping between HARQ-ACK(i) and {a PUCCH resource and a transmission bit} may be defined as shown in the following table according to the number (denoted by A) of PUCCH resources used in the channel selection.

TABLE 9

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission |

TABLE 10

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission |

TABLE 11

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK7DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | | No Transmission |

Table 9, Table 10, and Table 11 are respectively for cases of A=2, A=3, and A=4.

In FDD, a table similar to the above tables 9 to 11 is defined, and ACK/NACK may be transmitted according thereto.

Machine type communication (MTC), multi-user multi-input multi-output (MU-MIMO), and carrier aggregation between TDD cells using different UL-DL configurations may be used in a next generation wireless communication system. Further, the number of simultaneously scheduled UEs may be increased.

Accordingly, a control channel for scheduling an existing data channel may be insufficient. In order to solve a resource insufficient problem of a PDCCH which is a control channel in 3GPP LTE, bundled scheduling for scheduling a plurality of PDSCHs transmitted through a plurality of subframes or a plurality of cells through one PDCCH is considered or cross-subframe scheduling is considered to flexibly use the PDCCH. The cross-subframe scheduling is used so that a PDCCH for scheduling a PDSCH can be transmitted in a subframe different from a subframe in which the PDSCH is transmitted. In addition, it is also considered to introduce an enhanced-PDCCH (E-PDCCH) except for the existing PDCCH.

<E-PDCCH>

Figure 11:
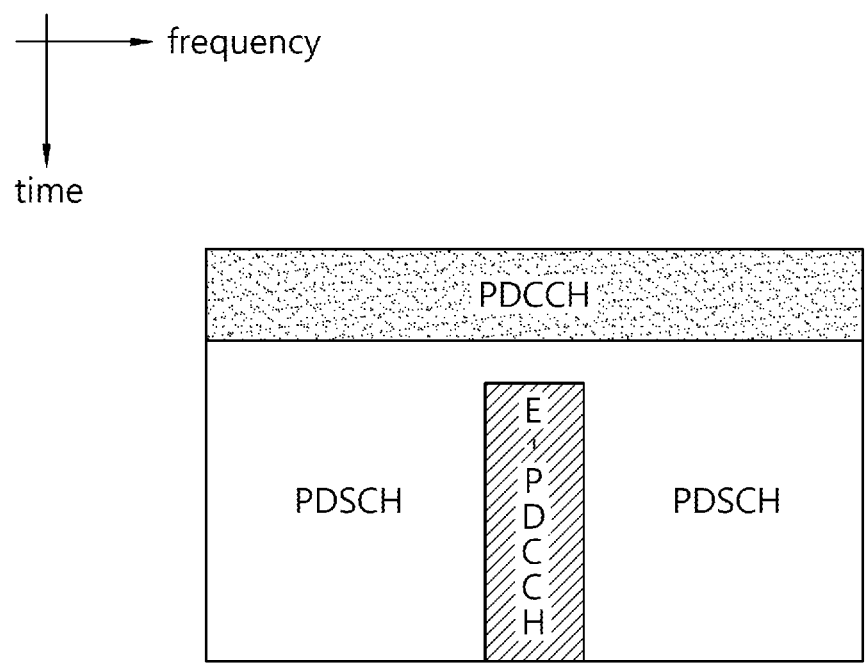
FIG. 11 illustrates an example of E-PDCCH allocation.

FIG. 11 illustrates an example of E-PDCCH allocation.

It is considered in LTE-A that an E-PDCCH which is a new control channel is allocated and used in a data region. The E-PDCCH is a control channel configured in a data region in which the PDSCH is transmitted and may be a control channel for performing demodulation by using a UE-specific reference signal. That is, the E-PDCCH is clearly distinguished from a PDCCH which is the existing control channel in a reference signal used for an allocated region and demodulation.

Meanwhile, the E-PDCCH configures an enhanced-CCE (E-CCE) similar to the PDCCH and may apply implicit PUCCH resource mapping based on the configured E-CCE. The E-CCE is a configuration unit for configuring the E-PDCCH. A resource amount included in the E-CCE may be the same as or different from a resource amount included in a CCE for configuring the PDCCH. Further, when an ARI is included in the E-PDCCH, an indication value using the ARI may be used to select an explicit PUCCH resource.

Now, the present invention is described.

As described above, an FDD type and a TDD type are present as a frame structure type in an LTE system.

In the FDD type, a UL subframe and a DL subframe are present always in a 1:1 manner in the same time point. On the other hand, in the TDD type, a ratio of the DL subframe and the UL subframe differs depending on a UL-DL configuration. Accordingly, in case of the TDD type, there is an advantage in that a frequency resource can be effectively utilized according to a DL/UL traffic ratio.

However, a significant time delay may occur when the UL-DL configuration is changed (reconfigured). For example, to change the UL-DL configuration, it is necessary to wait for an end of a previously running HARQ process or to stop the process. Accordingly, if a traffic is rapidly changed on a real-time basis, there is a restriction in an operation of changing the UL-DL configuration in an adaptive manner.

Accordingly, various methods are taken into account such as a method of applying a flexible UL/DL subframe in which whether to apply a UL/DL subframe can be configured dynamically, a method of more effectively using a resource such as an aggregation of cells to which different UL-DL configurations are applied, an aggregation of an FDD cell (or a cell configured with only a DL subframe, a cell configured with only a UL subframe) and a TDD cell, or the like.

When a UL-DL configuration of a cell is configured variously, a PUCCH format 1b with channel selection may be used as a plurality of ACK/NACK response configuration methods for reporting whether a data channel (more specifically, a control channel which requires an ACK/NACK response, e.g., a DL SPS release PDCCH) is normally received. In this case, conventionally, UL transmit power is determined under the assumption that each cell uses the same UL-DL configuration. However, in the future, each cell may use a different UL-DL configuration. Accordingly, a new UL transmit power control method is required.

In the legacy LTE system, in case of FDD, a DL subframe and a UL subframe are present consecutively in each subframe, and the number thereof is matched in a 1:1 manner. Therefore, ACK/NACK response timing for a DL data channel or DL control channel for requesting a UL ACK/NACK response is constantly maintained. For example, ACK/NACK transmitted in a subframe n is ACK/NACK for a DL data channel or DL control channel of a subframe n−4.

Meanwhile, in case of TDD, each subframe is a DL subframe or a UL subframe according to a UL-DL configuration (herein, for convenience, a special subframe is regarded as a DL subframe), and there is a case where a ratio of the DL subframe and the UL subframe is not matched in a 1:1 manner. Accordingly, the number of DL subframes matched to one UL subframe may be a plural number M.

Meanwhile, a future wireless communication system may use a method of applying a flexible UL/DL subframe in which whether to apply a UL/DL subframe can be configured dynamically and a method for more effectively using a cell resource such as an aggregation of cells to which different UL-DL configurations are assigned, an aggregation of an FDD cell and a TDD cell, etc. In this case, FDD/TDD DL HARQ-ACK timing (hereinafter ACK/NACK timing) may vary depending on a location configuration or the like of a scheduling cell for performing scheduling, a cell to be scheduled, and a cell for transmitting ACK/NACK.

To simplify a relation of such ACK/NACK timing, ACK/NACK timing defined in the following table may be used.

TABLE 12

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |
| FDD | 4 | 4 | 4 | 4 | 4 | 4 | 4 | 4 | 4 | 4 |

In the above table, in LTE-A Rel-11, only an aggregation between FDD cells and between TDD cells are allowed, and thus ACK/NACK timing of a last row may be excluded. When an aggregation between FDD and TDD cells are allowed in the future, the last row of the above table is also applicable.

Figure 12:
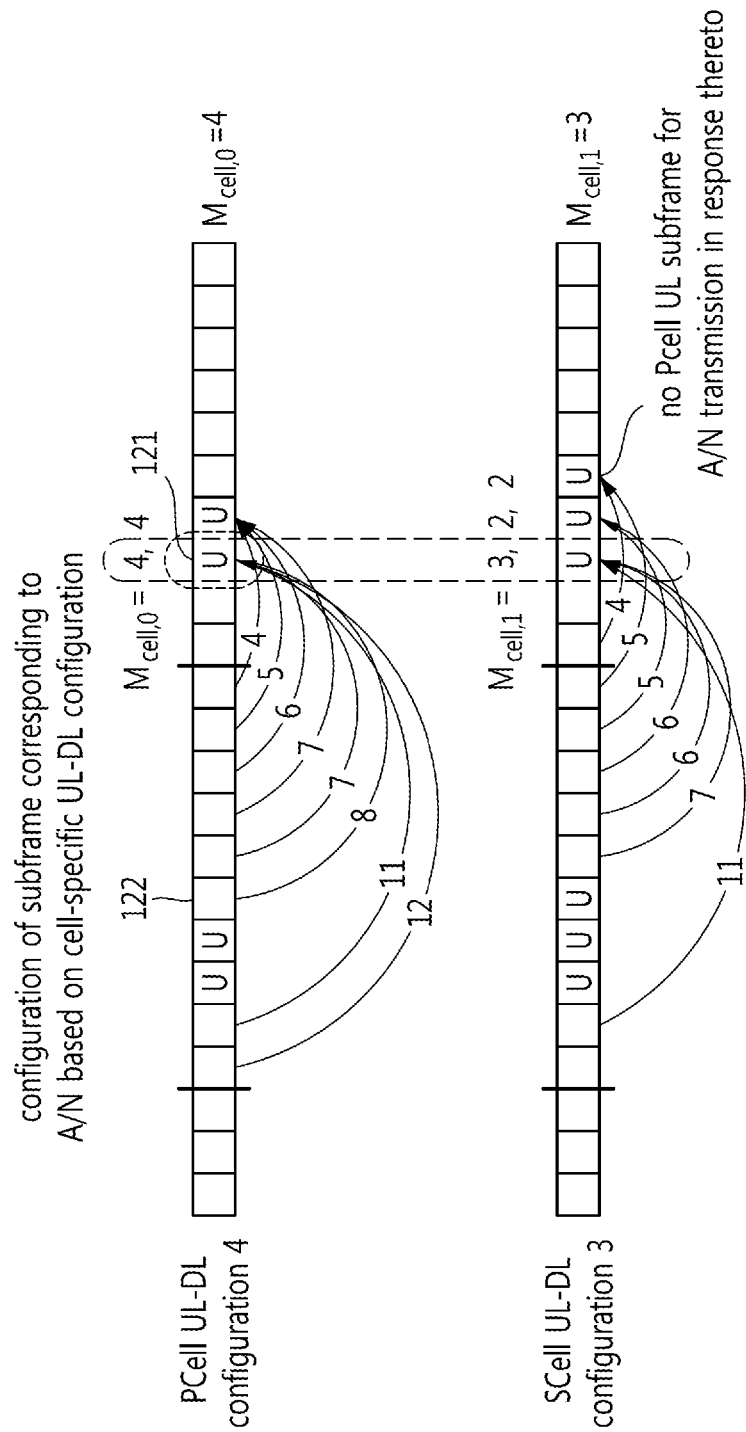
FIG. 12 shows examples of ACK/NACK timing in an aggregation of cells using different UL-DL configurations.

FIG. 12 shows examples of ACK/NACK timing in an aggregation of cells using different UL-DL configurations.

Referring to FIG. 12, a primary cell may use a UL-DL configuration 4, and a secondary cell may use a UL-DL configuration 3.

Each cell may use a first UL-DL configuration for determining a subframe structure in a frame and a second UL-DL configuration for determining ACK/NACK timing. The first UL-DL configuration may be a cell-specific UL-DL configuration configured through a system information block (SIB)1 of a corresponding cell. The second UL-DL configuration may be a reference UL-DL configuration for determining a DL subframe corresponding to ACK/NACK. An arrow that connects two subframes in FIG. 12 connects a DL subframe and a UL subframe which transmits ACK/NACK for the DL subframe. A number written in the arrow indicates how many subframes are present ahead of the UL subframe with respect to the DL subframe (the same is also applied to FIG. 13 to FIG. 15).

Figure 13:
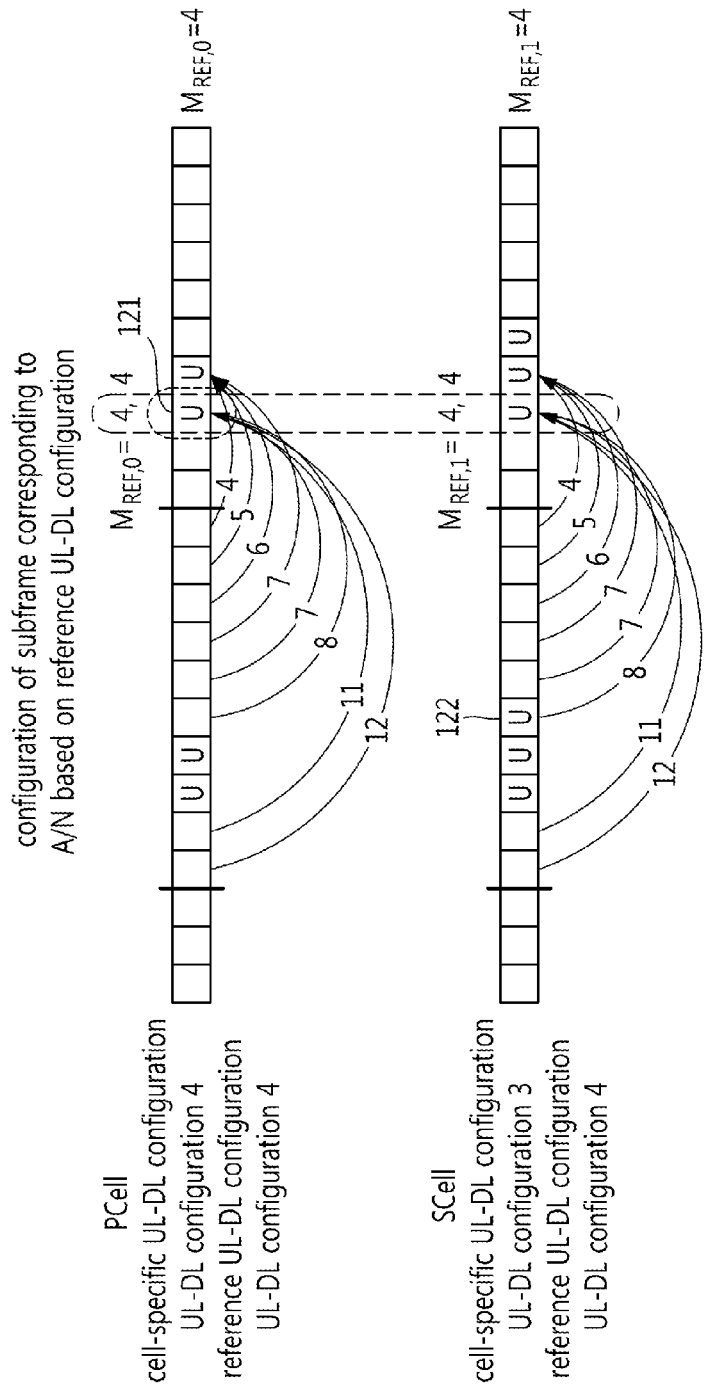
FIG. 13 and FIG. 14 show examples of a cell-specific UL-DL configuration and a reference UL-DL configuration in a primary cell and a secondary cell.
Figure 14:
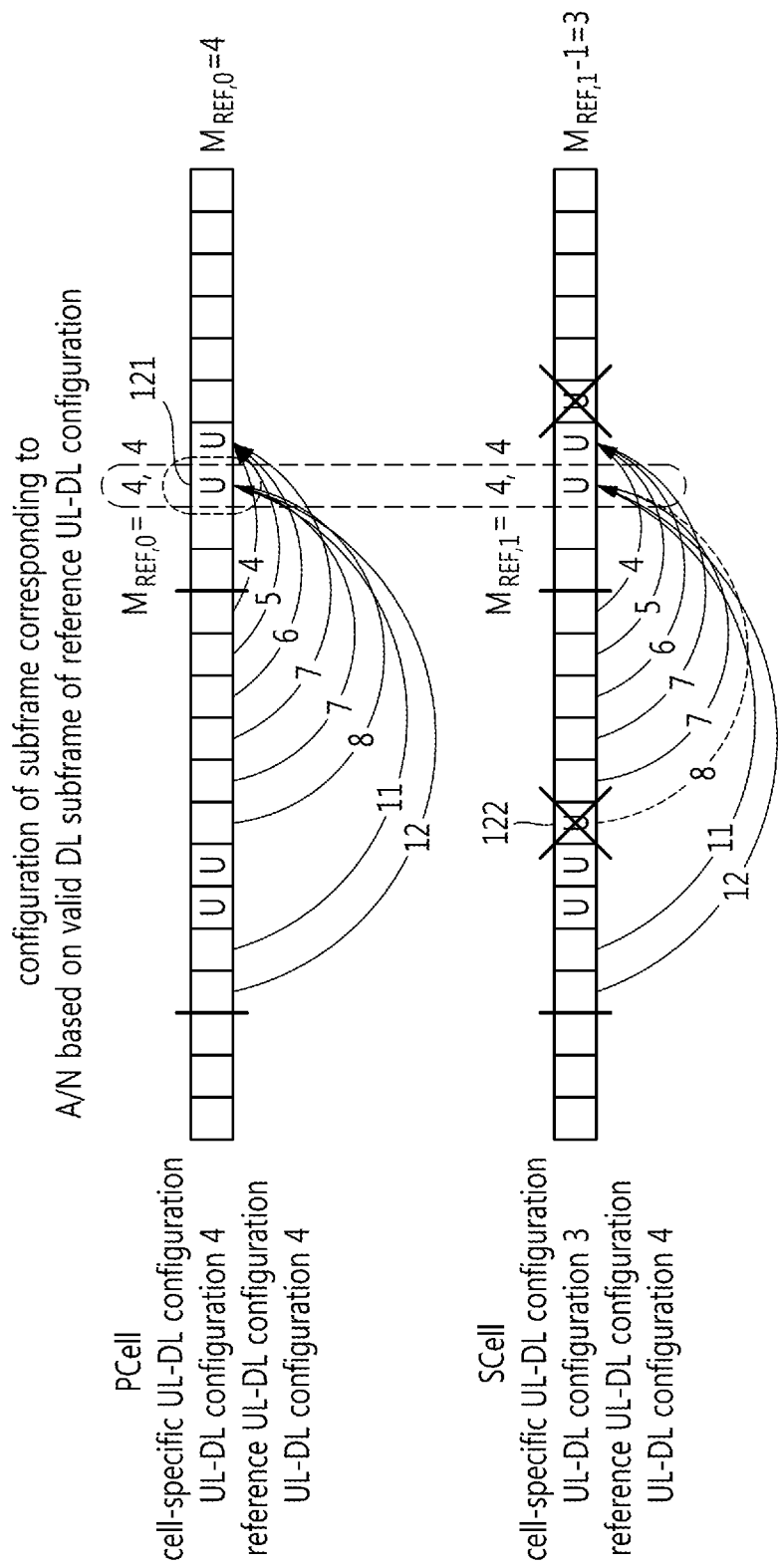

FIG. 13 and FIG. 14 show examples of a cell-specific UL-DL configuration and a reference UL-DL configuration in a primary cell and a secondary cell.

For example, the cell-specific UL-DL configuration of the secondary cell (i.e., a first UL-DL configuration) may be a UL-DL configuration 3, and a reference UL-DL configuration used to determine ACK/NACK timing (i.e., a second UL-DL configuration) may be a UL-DL configuration 4.

In this case, ACK/NACK timing is specified according to the second UL-DL configuration, whereas unnecessary ACK/NACK timing may occur according to the first UL-DL configuration.

In FIG. 13 and FIG. 14, a subframe #4 122 of the secondary cell is a UL subframe according to the first UL-DL configuration, but is a DL subframe according to the second UL-DL configuration. That is, it is assumed that the subframe #4 122 is the DL subframe according to the second UL-DL configuration, and corresponding ACK/NACK timing is given. However, since the subframe #4 122 is the UL subframe according to the first UL-DL configuration, DL data or a control channel is not transmitted by a BS in the subframe #4 122. Therefore, it may be unnecessary to secure ACK/NACK (A/N) transmission resources for the subframe #4 122.

When a UE applies a PUCCH format 1b with channel selection, a DL subframe which is a target of ACK/NACK may be determined by using one of the following methods.

1. For a cell c, DL subframes corresponding to $K_c$ specified in a UL subframe according to Table 12 on the basis of a cell-specific UL-DL configuration may be determined as DL subframes which are targets of ACK/NACK transmitted in the UL subframe. If the number of elements of $K_c$ is $M_c$, the number of DL subframes matched to the UL subframe is $M_c$. That is, according to a first UL-DL configuration, the DL subframes matched to the UL subframe and ACK/NACK timing are determined.

2. For the cell c, DL subframes corresponding to $K_{REF,c}$ specified in a UL subframe according to Table 12 on the basis of a UL-DL configuration used to determine ACK/NACK timing may be determined as DL subframes which are targets of ACK/NACK transmitted in the UL subframe. If the number of elements of $K_{REF,c}$ is $K_{REF,c}$, the number of DL subframes matched to the UL subframe is $K_{REF,c}$. That is, according to a second UL-DL configuration, the DL subframes matched to the UL subframe and ACK/NACK timing are determined.

3. For the cell c, DL subframes corresponding to $K_{REF,c}$ specified in a UL subframe according to Table 12 on the basis of a UL-DL configuration used to determine ACK/NACK timing may be determined first, and thereafter only valid DL subframes may be determined as DL subframes which are targets of ACK/NACK transmitted in the UL subframe.

A valid DL subframe is a DL subframe which is not an invalid DL subframe. As described above, the invalid DL subframe may be a DL subframe in which ACK/NACK timing is specified according to the second UL-DL configuration whereas unnecessary ACK/NACK timing occurs according to the first UL-DL configuration.

It is assumed that a set of invalid DL subframes included in $K_{REF,c}$ is denoted by $K^{invalid}_{REF,c}$, and a set of valid DL subframes is denoted by $K^{valid}_{REF,c}$. It is also assumed that the number of elements of $K_{REF,c}$ is denoted by $M_{REF,c}$, the number of elements of $K^{valid}_{REF,c}$ is denoted by $M^{valid}_{REF,c}$, and the number of elements of $K^{invalid}_{REF,c}$ is denoted by $M^{invalid}_{REF,c}$. Then, $M^{valid}_{REF,c}=M_{REF,c}-M^{invalid}_{REF,c}$.

$M_{REF,c}$ is the number of elements of K in a DL subframe n-$k_i$ matched to a UL subframe n which is an ACK/NACK transmission subframe for a second UL-DL configuration applied to the serving cell c. $M^{valid}_{REF,c}$ is the number of valid DL subframes among DL subframes n-$k_i$ matched to the UL subframe n which is the ACK/NACK transmission subframe for the second UL-DL configuration applied to the serving cell c. $M^{invalid}_{REF,c}$ is the number of invalid DL subframes among the DL subframes n-$k_i$ matched to the UL subframe n which is the ACK/NACK transmission subframe for the second UL-DL configuration applied to the serving cell c.

In the first method, an ACK/NACK transmission target DL subframe is determined based on a cell-specific UL-DL configuration (the first UL-DL configuration), and there may be a case where ACK/NACK cannot be transmitted as to some subframes of a secondary cell. In the second method, an ACK/NACK transmission target DL subframe is determined based on the second UL-DL configuration, and there is a disadvantage in that actual scheduling is impossible and thus ACK/NACK for an unnecessary link is included. However, there is an advantage in that ACK/NACK can be transmitted irrespective of a subframe validity which varies for each combination of the UL-DL configuration. In the third method, an ACK/NACK transmission target DL subframe is determined by using only a valid DL on the basis of the second UL-DL configuration. In this case, since unnecessary ACK/NACK is excluded, ACK/NACK can be effectively transmitted.

Whether the DL subframe is valid/invalid may be determined according to whether DL data (and/or DL control information) can be transmitted in a carrier aggregation situation. When the second UL-DL configuration is assigned, whether the DL subframe is valid/invalid may be determined as follows. For convenience of explanation, a special subframe is aside from consideration.

In case of a subframe in which a transmission direction (i.e., UL or DL) based on a cell-specific UL-DL configuration (the first UL-DL configuration) does not coincide with a transmission direction based on a reference UL-DL configuration (the second UL-DL configuration), a UE may designate the subframe as an unused subframe (this is called an X subframe). That is, the X subframe is the unused subframe. For example, when a carrier aggregation is applied to a UE which supports a half-duplex, a cell specific UL-DL configuration transmitted through SIB of each of a plurality of aggregated cells may be different. For example, if cells A and B are subjected to the carrier aggregation, there may be a subframe which is used as 'D' according to a UL-DL configuration of the cell A and is used as 'U' according to a UL-DL configuration of the cell B. That is, there may be a subframe of which a transmission direction is set differently in a plurality of cells. Such a subframe is a subframe which cannot be used in the UE.

The following description is for a case where cells to which different UL-DL configurations are assigned are aggregated and a UE operates in a full-duplex mode.

In a case where a reference UL-DL configuration of a cell c is the same as a cell-specific UL-DL configuration, $M^{invalid}_{REF,c}=0$ if there is no restriction on special DL subframe scheduling. A case of non-cross carrier scheduling may be an example thereof, and a primary cell may be an example thereof.

If the cell c is subjected to cross-carrier scheduling and a subframe n-ki of a scheduling cell for performing scheduling is not a DL subframe, this subframe is an invalid DL subframe. Herein, it is assumed that cross-subframe scheduling or bundled subframe scheduling is not supported.

In a case where the reference UL-DL configuration of the cell c is different from the cell-specific UL-DL configuration, if the subframe n-ki defined according to the reference UL-DL configuration is not a DL subframe on the basis of the cell-specific UL-DL configuration, this subframe is an invalid DL subframe.

For example, if a DL subframe in a cell-specific UL-DL configuration in a secondary cell is a sub-set of subframes which are DL subframes on the basis of a cell-specific UL-DL configuration of a primary cell, a reference UL-DL configuration of the secondary cell may be a UL-DL configuration of the primary cell. In this case, DL subframes of the secondary cell which is not an intersection with respect to a valid DL subframe of the primary cell are invalid DL subframes.

For example, a UL-DL configuration of Table 12 in which all UL subframes are included in a UL subframe intersection between a cell-specific UL-DL configuration of a secondary cell and a cell-specific UL-DL configuration of a primary cell (i.e., a set of subframes when both of the primary cell and the secondary cell are UL subframes) may be a reference UL-DL configuration of the secondary cell. Preferably, among them, a configuration in which the number of UL subframes (in comparison with the DL subframes) is greatest may be selected. A subframe which does not correspond to a reference UL-DL configuration and a DL subframe intersection (a subframe configured as a UL subframe in both of cell-specific and reference UL-DL configurations) is an invalid subframe of the secondary cell.

The following description is for a case where a UE operates in a half-duplex mode in a carrier aggregation between cells to which different UL-DL configurations are assigned.

Even if the reference UL-DL configuration of the cell c is the same as the cell-specific UL-DL configuration, an X subframe may be generated according to a transmission direction of aggregated cells, and the X subframe is an invalid subframe.

In a primary cell, the cell-specific UL-DL configuration and the reference UL-DL configuration are identical. When the transmission direction of the primary cell is applied to the aggregated secondary cell, the X subframe is not generated in the primary cell. Accordingly, if the transmission direction of the primary cell is applied to aggregated other cells, the X subframe is not generated in the primary cell, and $M^{invalid}_{REF,c}=0$.

In case of the secondary cell, there is a case where a DL subframe based on the cell-specific UL-DL configuration of the cell c is an invalid subframe since it does not coincide with the reference UL-DL configuration and a case where an X subframe which is generated since a transmission direction of aggregated cells is different from that of the cell-specific UL-DL configuration is an invalid subframe.

If the reference UL-DL configuration of the cell c is different from the cell-specific UL-DL configuration, when a subframe n-k$_i$ defined in the reference UL-DL configuration is not a DL subframe on the basis of the cell-specific UL-DL configuration, such a subframe may be an invalid DL subframe. In addition, an X subframe which is generated since a transmission direction of aggregated cells is different from that of the cell-specific UL-DL configuration may be an invalid subframe.

For example, if a DL subframe in a cell-specific UL-DL configuration of a secondary cell is a sub-set of DL subframes based on a cell-specific UL-DL configuration of a primary cell, a reference UL-DL configuration of the secondary cell may be a cell-specific UL-DL configuration of the primary cell. In this case, a subframe of a secondary cell which is not an intersection of a valid DL subframe of the primary cell is an invalid subframe. Herein, a case where the DL subframe is an X subframe does not occur.

For example, similarly to the aforementioned full-duplex case, a UL-DL configuration of Table 12 in which all UL subframes are included in a UL subframe intersection between a cell-specific UL-DL configuration of a cell c, i.e., a secondary cell, and a cell-specific UL-DL configuration of a primary cell (i.e., a set of subframes when both of the primary cell and the secondary cell are UL subframes) may be a reference UL-DL configuration of the secondary cell. Preferably, among them, a configuration in which the number of UL subframes (in comparison with the DL subframes) is greatest may be selected. In this case, a subframe of a secondary cell which is not a DL subframe intersection of the reference UL-DL configuration is an invalid subframe.

In addition, an X subframe which is generated since a transmission direction of aggregated cells is different from that of the cell-specific UL-DL configuration may be an invalid subframe.

Figure 15:
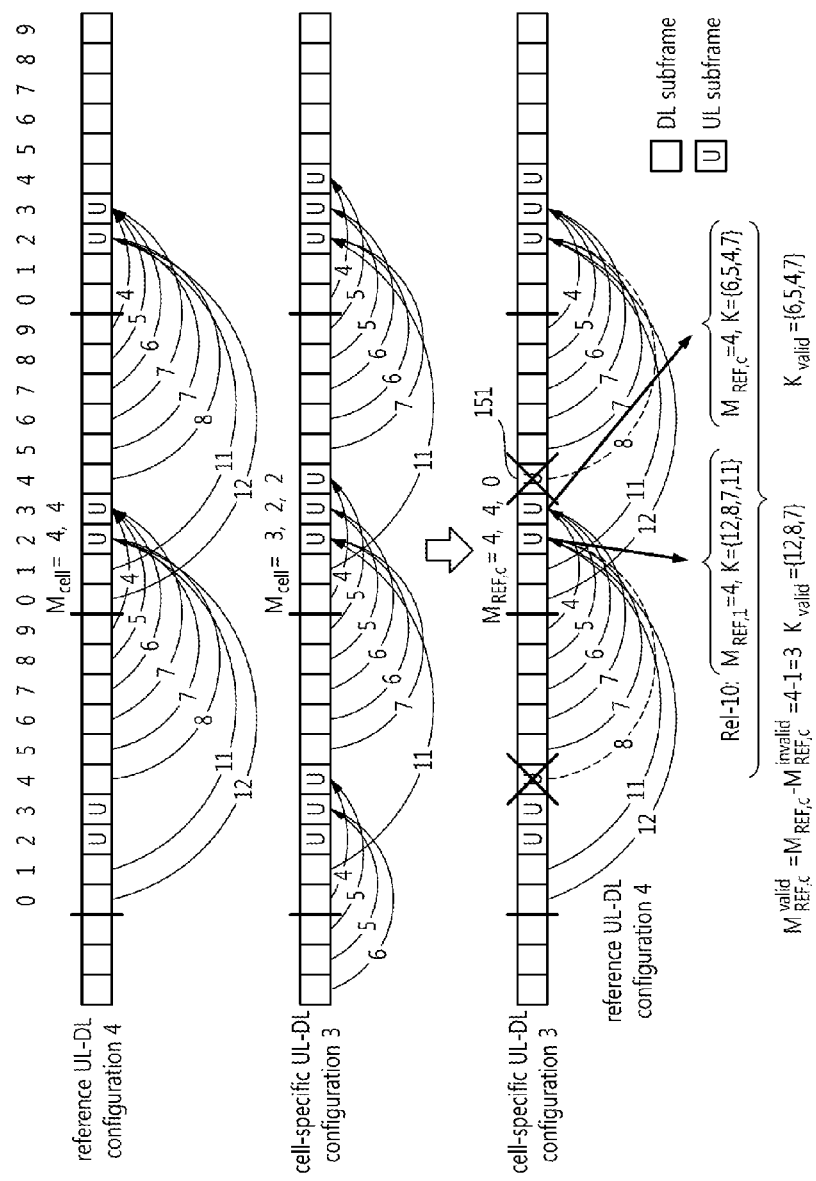
FIG. 15 shows an example of distinguishing an invalid DL subframe and a valid DL subframe.

FIG. 15 shows an example of distinguishing an invalid DL subframe and a valid DL subframe.

Referring to FIG. 15, when a reference UL-DL configuration is a UL-DL configuration 4 and a cell-specific UL-DL configuration is a UL-DL configuration 3, a UL subframe 151 indicated by X is an invalid subframe.

Now, a method of determining transmit power of an uplink control channel is described.

[Transmit Power Control of PUCCH]

If a serving cell c is a primary cell, PUCCH transmit power $P_{PUCCH}$ in a subframe i of a UE may be defined by the following equation.

[Equation 3]

$$P_{PUCCH}(i) = \min \begin{cases} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{cases}$$

In the above equation, $P_{CMAX,c}(i)$ is transmit power configured to the UE in the subframe i of the serving cell c.

$\Delta_{F\_PUCCH}(F)$ is provided by a higher layer, and a value of $\Delta_{F\_PUCCH}(F)$ is a value corresponding to a PUCCH format F based on a PUCCH format 1a. $\Delta_{TxD}(F')$ is a value given by the higher layer if the UE is configured to transmit a PUCCH in two antenna ports by the higher layer, and otherwise is 0.

$P_{O\_PUCCH}$ is a value given by the higher layer, and g(i) is a current PUCCH power control adjustment state. $PL_c$ is a value for a path loss.

$h(n_{CQI}, n_{HARQ}, n_{SR})$ is a value depending on a PUCCH format. $n_{CQI}$ corresponds to the number of CQI information bits. $n_{SR}$ is 1 if SR is set in the subframe i, and otherwise 0.

$n_{HARQ}$ denotes the number of ACK/NACK bits transmitted in the subframe i when one serving cell is configured to the UE. Otherwise, it is determined as follows.

1) In FDD, if two serving cells are configured to the UE and a PUCCH format 1 b with channel selection is configured or if at least two serving cells are configured and a PUCCH format 3 is configured, $n_{HARQ}$ is determined by the following equation.

$$n_{HARQ} = \sum_{c=0}^{N_{cells}^{DL}-1} N_c^{received} \quad \text{[Equation 4]}$$

In the above equation, $N^{DL}_{cells}$ denotes the number of configured cells, and $N^{received}_c$ denotes the number of transport blocks or the number of SPS release PUCCHs received in a subframe n−4 of a serving cell c.

That is, if transport blocks received in a subframe n−4 of each of configured cells and ACK/NACK for an SPS release PDCCH are transmitted through a PUCCH of a subframe n, $n_{HARQ}$ for determining PUCCH transmit power is determined as expressed in the above equation.

2) In TDD, if two serving cells are configured, a PUCCH format 1b with channel selection is configured, and a value M in a subframe n is 1, or if a UL-DL configuration 0 is used and a PUCCH format 3 is configured, $n_{HARQ}$ is determined by the following equation.

$$n_{HARQ} = \sum_{c=0}^{N_{cells}^{DL}-1} \sum_{k \in K} N_{k,c}^{received} \quad \text{[Equation 5]}$$

In the above equation, $N^{received}_{k,c}$ is the number of transmit blocks or the number of SPS release PDDCHs received in a subframe n-k(k∈K) of a serving cell c. M is the number of elements of k.

In TDD, if UL-DL configurations 1 to 6 and a PUCCH format 3 are configured or if two serving cells are configured, a PUCCH format 1b with channel selection is configured, and M=2, then $n_{HARQ}$ is determined by the following equation.

$$n_{HARQ} = \sum_{c=0}^{N_{cells}^{DL}-1} \left( ((V_{DAI,c}^{DL} - U_{DAI,c}) \bmod 4) \cdot n_c^{ACK} + \sum_{k \in K} N_{k,c}^{received} \right) \quad \text{[Equation 6]}$$

In the above equation, $V^{DL}_{DAI,c}$ denotes $V^{DL}_{DAI}$ of a serving cell c, and implies a DAI value (hereinafter, the same is applied) of a PDCCH/E-PDCCH having DCI formats 1/1A/1B/1D/2/2A/2B/2C/2D in a subframe n-$k_m$ of the serving cell c (where $k_m$ is the smallest value used by a UE to detect DCI formats 1/1A/1B/1D/2/2A/2B/2C/2D in a set K (see Table 7, the same is applied hereinafter)). $U_{DAI,c}$ is $U_{DAI}$ of the serving cell c, and denotes the total number of PDCCHs/E-PDCCHs related to a PDSCH transmission in a subframe n-k(k∈K) of the serving cell c (hereinafter, the same is applied). $n^{ACK}_c$ is the number of ACK/NACK bits corresponding to a DL transmission mode configured to the serving cell c. If spatial bundling is applied to ACK/NACK, $n^{ACK}_c=1$. Further, $N^{received}_{k,c}$ is the number of PDCCHs or the number of PDSCHs without a corresponding PDCCH, received in a subframe n-k(k∈$K_c$) of the serving cell c. $M_c$ is the number of elements of $K_c$. If spatial bundling is not applied to ACK/NACK, $N^{received}_{k,c}$ is the number of transport blocks or SPS release PDCCHs received in the subframe n-k(k∈$K_c$) of the serving cell c. $M_c$ is the number of elements of $K_c$. If no transport block or SPS release PDCCH is detected in the subframe n-k(k∈$K_c$) of the serving cell c, $V^{DL}_{DAI,c}=0$.

In TDD, in a case where serving cells are configured, a PUCCH format 1b with channel selection is configured, and M=3 or 4, if a UE receives a PDSCH or a DL SPS release PDCCH in a subframe n-k of only one serving cell, $n_{HARQ}$ is 2, and otherwise, $n_{HARQ}$ is 4.

As to the PUCCH formats 1, 1a, 1b, $h(n_{CQI}, n_{HARQ}, n_{SR})$ is 0.

As to the PUCCH format 1b with channel selection, if at least two serving cells are configured to the UE, $h(n_{CQI}, n_{HARQ}, n_{SR})$ is $(n_{HARQ}-1)/2$, and otherwise, is 0.

As to the PUCCH formats 2, 2a, 2b and the normal CP, $h(n_{CQI}, n_{HARQ}, n_{SR})$ is given by the following equation.

$$h(n_{CQI}, n_{HARQ}, n_{SR}) = \begin{cases} 10\log_{10}\left(\frac{n_{CQI}}{4}\right) & \text{if } n_{CQI} \geq 4 \\ 0 & \text{otherwise} \end{cases} \quad \text{[Equation 7]}$$

As to the PUCCH formats 2, 2a, 2b and the extended CP, $h(n_{CQI}, n_{HARQ}, n_{SR})$ is given by the following equation.

$$h(n_{CQI}, n_{HARQ}, n_{SR}) = \quad \text{[Equation 8]}$$
$$\begin{cases} 10\log_{10}\left(\frac{n_{CQI}+n_{HARQ}}{4}\right) & \text{if } n_{CQI}+n_{HARQ} \geq 4 \\ 0 & \text{otherwise} \end{cases}$$

As to a PUCCH format 3, if it is configured by a higher layer that a PUCCH is transmitted through two antenna ports or if a UE transmits ACK/NACK and SR greater than 11 bits, $h(n_{CQI}, n_{HARQ}, n_{SR})$ is given by Equation 9 below, and otherwise is given by Equation 10 below.

$$h(n_{CQI}, n_{HARQ}, n_{SR}) = \frac{n_{HARQ}+n_{SR}-1}{3} \quad \text{[Equation 9]}$$

$$h(n_{CQI}, n_{HARQ}, n_{SR}) = \frac{n_{HARQ}+n_{SR}-1}{2} \quad \text{[Equation 10]}$$

Meanwhile, in a method of determining the aforementioned PUCCH transmit power, if a plurality of cells are configured to a UE in TDD, it is premised that UL-DL configurations of the plurality of cells are all identical. A parameter $n_{HARQ}$ which is required to determine transmit power of a PUCCH transmitted in a subframe n may vary depending on a value M. If the plurality of cells have the same UL-DL configuration, the value M is identical in the same subframe of the plurality of cells. However, if UL-DL configurations of the plurality of cells are different, the value M may vary in the subframe of the plurality of cells.

Now, a method of determining PUCCH transmit power is described when a plurality of cells are configured to a UE in TDD and at least two cells of the plurality of cells have different UL-DL configurations.

Figure 16:
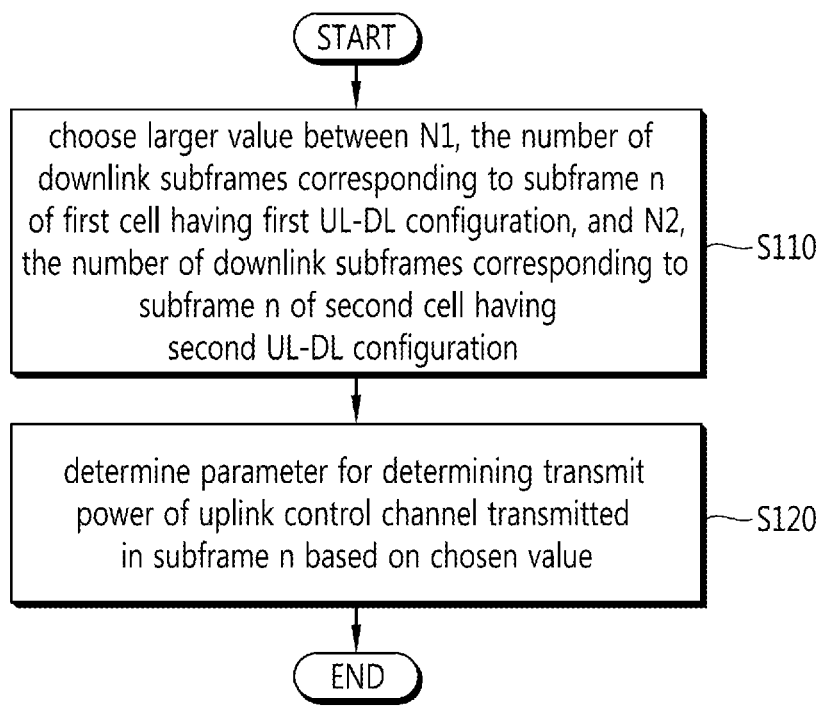
FIG. 16 shows an example of a method of determining PUCCH transmit power according to an embodiment of the present invention.

FIG. 16 shows an example of a method of determining PUCCH transmit power according to an embodiment of the present invention.

Referring to FIG. 16, a UE chooses a larger value between N1, the number of downlink subframes corresponding to a subframe n of a first cell having a first UL-DL configuration, and N2, the number of downlink subframes corresponding to a subframe n of a second cell having a second UL-DL configuration (step S110). If the chosen value is M, M=max (N1, N2). The first cell may be a primary cell in which the UE performs an initial connection establishment procedure or a connection re-establishment procedure with respect to a BS. The second cell may be a secondary cell which is added to the primary cell.

Thereafter, a parameter $n_{HARQ}$ for determining transmit power of an uplink control channel (i.e., PUCCH) transmitted in the subframe n is determined on the basis of the chosen value (step S120). The PUCCH can be transmitted only through the primary cell. In this case, the parameter $n_{HARQ}$ for determining the transmit power of the uplink control channel (i.e., PUCCH) is used to determine transmit power of a PUCCH transmitted in a subframe n of a primary cell. The UE may determine the transmit power of the PUCCH on the basis of the parameter. The procedure of determining the transmit power of the PUCCH is described above with reference to Equations 3 to 10.

For example, the chosen value M may be 3 or 4. In this case, in a subframe n-k (k∈K, where K may be found in Table 7) of only one cell between the first cell and the second cell, a value of the parameter for determining the transmit power of the PUCCH is 2 if a data channel or a control channel indicating a release of semi-static scheduling is received, and otherwise, 4.

For example, in TDD, in a case where two serving cells are configured to a UE, a PUCCH format 1b with channel selection is configured, and M=3 or 4, if the UE receives a PDSCH or a DL SPS release PDCCH in a subframe n-k of only one serving cell, $n_{HARQ}$ is 2, and otherwise, $n_{HARQ}$ is 4. In other words, a value of the parameter may be the same as a parameter value for determining transmit power of an uplink control channel transmitted in a subframe n when the first cell and the second cell have the same UL-DL configuration (i.e., when the first cell and the second cell commonly have a UL-DL configuration which provides a larger value between N1 and N2 in the first UL-DL configuration and the second UL-DL configuration). The UE transmits ACK/NACK by using the PUCCH format 1 b with channel selection when M=4 or 3.

The first cell may be a primary cell in which the UE performs an initial connection establishment procedure with respect to the BS. The second cell may be a secondary cell which is added to the primary cell.

The following description relates to a procedure in which a UE transmits ACK/NACK according to a combination of a value M which may be used in a plurality of cells configured to the UE and various examples of determining a parameter $n_{HARQ}$ to determine PUCCH transmit power.

Conventionally, when two cells having the same UL-DL configuration are aggregated, a PUCCH format 1b with channel selection is applied by using the following methods.

1) In case of M=3, 4: The number of consecutive ACK responses is transmitted by using a channel selection scheme as to a data/control channel scheduled for a DL subframe of each cell. Herein, if a transmission mode of the cell can transmit two transport blocks, the number of ACK responses subjected to spatial bundling is counted.

2) In case of M=2: Four ACK/NACK responses for two DL subframes of each cell are transmitted by using a channel selection scheme. If a transmission mode of the cell can transmit two transmission blocks, ACK/NACK subjected to spatial bundling is transmitted.

3) In case of M=1: The number of resources used in channel selection is determined according to the maximum number of to-be-scheduled transport blocks of each cell. If the number of transport blocks (TBs) transmitted in two cells is expressed by (the number of TBs of a first cell, the number of TBs of a second cell), a channel selection scheme uses two resources in case of (1 TB, 1 TB), three resources in case of (1 TB, 2 TB) or (2 TB, 1 TB), and four resources in case of (2 TB, 2 TB).

Such methods are for transmitting ACK/NACK which is not bundled if possible under a hypothesis that scheduling is performed to the maximum extent possible.

If a data/control channel actually scheduled to a UE is not scheduled to the maximum extent possible, the number of hypotheses to be tested when a BS performs decoding may be decreased, and if transmit power of a PUCCH is configured according to the maximum number of hypotheses, an unnecessary power waste may occur. A data/control channel which is not scheduled by the BS is always mapped to NACK, and thus may not cause a change in a PUCCH resource and constellation selection.

For example, when M=3 or 4, if only a primary cell is scheduled, ACK/NACK for a secondary cell is fixed to NACK, and only ACK/NACK for the primary cell is taken into account. Therefore, only transmit power for 2-bit decoding is necessary. Accordingly, the UE determines $n_{HARQ}$ by considering an actually scheduled state in which ACK/NACK is generated, and allocates power in proportion thereto to the PUCCH.

Although it is described above, it can be summarized again as follows. In the conventional TDD, if two cells having the same UL-DL configuration are aggregated and a UE transmits ACK/NACK by using a PUCCH format 1b with channel selection, $n_{HARQ}$ is determined as follows according to the value M determined based on a UL subframe.

I) In case of M=1: It is a sum of the number of received codewords (or transport blocks) and control channels requiring an ACK/NACK response. The same is also applied to FDD.

2) In case of M=2: Even if two codewords are received, ACK/NACK responses for the two codewords are transmitted as one ACK/NACK response by applying spatial bundling. A sum of the number of control channels (a PDCCH for scheduling a PDSCH, an SPS activation PDCCH, and an SPS release PDCCH are included) received by a UE, the number of PDSCHs without a corresponding control channel, and the number of control channels (it can be estimated by using a DL DAI value) which are determined as being failed when received by the UE.

3) In case of M>2: If it is determined that the UE is scheduled through only one cell (i.e., if both of a data channel and a control channel requiring an ACK/NACK response are received only through one cell), it is 2, and otherwise 4.

Meanwhile, assume that aggregated two serving cells are x and y. Also, assume that DL subframes which are transmission targets of ACK/NACK transmitted in one UL subframe are Mx and My respectively in the cells x and y. In this case, Mx and My may be determined according to one of the above cases 1 to 3.

If Mx and My are different from each other, $n_{HARQ}$ may use one of the following methods.

A method of the case 1) may be always applied to Mx of the primary cell. A method of the case 2) or a method of the case 3) may be applied to My of the secondary cell.

Hereinafter, an optimal transmit power allocation method is described according to a combination of (Mx, My).

Hereinafter, SPS may also be applied to the secondary cell. If the SPS is applied only to the primary cell, a content related to the SPS may be excluded from a content related to a cell corresponding to the secondary cell.

1. In case of (Mx, My)=(4, 1) or (3, 1)

A value M is determined based on a maximum value between Mx and My. That is, M=max(Mx, My). Thereafter, ACK/NACK is transmitted by using a PUCCH format 1b with channel selection in M=4 or 3.

1.1.A Optimal Power Allocation Method

When a UE is scheduled in both of two cells, the number of ACK responses may be 0(4), 1, 2, 3 according to consecutive ACK counting for a cell x, and thus 4 hypotheses are required in total. On the other hand, 0 and 1 are possible values according to consecutive ACK counting for a cell y, and thus two hypotheses are required.

The total number of hypotheses determined using channel selection is 0. In this case, optimally, $n_{HARQ}$=3.

When the UE is scheduled only in one cell, 0(4), 1, 2, 3 are possible values according to consecutive ACK counting for the cell x, and thus 4 hypotheses are required. Therefore, $n_{HARQ}$=2. 0 and 1 are possible values according to consecutive ACK counting for the cell y, and thus two hypotheses are required, and $n_{HARQ}$=1.

Since the maximum number of hypotheses are predetermined, an unnecessary power allocation can be decreased.

That is, if the UE is scheduled for two serving cells, $n_{HARQ}$=3 since {Mp,Ms}={1,4},{1,3},{4,1} or {3,1}. Mp is a value M in a primary cell, and Ms is a value M in a secondary cell. If the UE is scheduled for only one serving cell with M=1, $n_{HARQ}$=1. If the UE is scheduled for only one serving cell and M=3 or 4, $n_{HARQ}$=2.

This can be summarized by the following equation.

$$n_{HARQ} = n_x + \sum_{k \in K_y} N_{k,y}^{received} \qquad [\text{Equation 11}]$$

Herein, if the UE receives an SPS release PDCCH or PDSCH in a subframe n-k(k∈$K_x$) of a serving cell x, $n_x$=2. Otherwise, $n_x$=0. $N^{received}_{k,y}$ is the number of PUCCHs received in a subframe n-k(k∈$K_y$) of a serving cell y or the number of PDSCHs without a corresponding PDCCH.

When the consecutive ACK counting number for the cell x is transmitted by using a channel selection scheme, the consecutive ACK counting number is 0 or 1 for a case 1) where only one subframe is scheduled using a PDCCH with DAI=1 (for example, a PDSCH scheduled using a PDCCH with DAI=1 or a DL SPS release PDCCH with DAI=1) or a case 2) where a PDSCH (SPS PDSCH) without a corresponding PDCCH is received only in one subframe. When considering this, if both of two cells are scheduled, $n_{HARQ}$=2, and if only the cell x is scheduled, $n_{HARQ}$=1.

A performance deterioration may occur disadvantageously when the UE fails to receive a last PDCCH (for example, if an SPS PDSCH is absent, all PDCCHs with DAI>1, and if the SPS PDSCH is present, all PDCCHS with DAI>1) scheduled by a BS.

This can be expressed by the following equation.

$$n_{HARQ} = n_x + \sum_{k \in K_y} N_{k,y}^{received} \qquad [\text{Equation 12}]$$

In the above equation, if the UE receives at least two PDSCHs, $n_x$=2. Further, if the UE receives only one PDSCH without a corresponding PDCCH in the subframe n-k(k∈$K_x$) of the serving cell x or receives a PDSCH scheduled by a PDCCH with DAI=1 or receives only one DL SPS release PDCCH with DAI=1, $n_x$=1. Otherwise, $n_x$=0. $N^{received}_{k,y}$ is the number of PDCCHs or the number of PDSCHs without a corresponding PDCCH, received in the subframe n-k (k∈$K_y$) of the serving cell y.

1.1.B

If a UE is scheduled for both of two serving cells, it is an optimal method to determine $n_{HARQ}$ by considering values that can be used for a consecutive ACK counting number. However, such a method disadvantageously has a great complexity.

Accordingly, $n_{HARQ}$ may be determined in the same manner as the conventional case of M=3, 4 so that $n_{HARQ}$ is not changed according to a change in a value My.

Alternatively, an optimal method may be used for each Mx and My. That is, if ACK/NACK corresponds to a cell x, as in the case of M=4 or 3, a consecutive ACK counting number may be transmitted by using a channel selection scheme, and as in the case of M=1, according to the number of transport blocks, ACK/NACK corresponding to a cell y may be mapped to 2 ACK/NACK responses in case of 2 transport blocks, and may be mapped to one ACK/NACK response in case of one transport block.

1.2.A. Optimal Power Allocation Method.

If a UE is scheduled for both of two cells, 0(4), 1, 2, 3 are possible for a consecutive ACK counting number for a cell x. Regarding ACK/NACK for a cell y, 2 ACK/NACK responses are transmitted when 2 transport blocks are received, and there are four types of candidate values (A, A), (A, N), (N, A), (N, N). If one transport block is received, one ACK/NACK response is transmitted, and there are two types of candidate values, i.e., ACK and NACK.

Therefore, a sum of respective candidate values is 8 (when the cell y receives two transport blocks) or 6 (when the cell y receives one transport block). Accordingly, optimally, $n_{HARQ}$=4 or 3, respectively.

In a case where a UE is scheduled only for one cell, if only the cell x is scheduled, $n_{HARQ}$=2, and if only the cell y is scheduled, $n_{HARQ}$=2 or 1 respectively according to whether the number of received transport blocks is 2 or 1.

This can be expressed by the following equation.

$$n_{HARQ} = n_x + \sum_{k \in K_y} N_{k,y}^{received} \qquad [\text{Equation 13}]$$

If the UE receives a DL SPS release PDCCH or PDSCH in a subframe n-k(k∈$K_x$) of a serving cell x, $n_x$=2. Otherwise, $n_x$=0. $N^{received}_{k,y}$ is the number of DL SPS release PUCCHs received in a subframe n-k(k∈$K_y$) of a serving cell y.

When the consecutive ACK counting number for the cell x is transmitted by using channel selection, the consecutive ACK counting number is 0 or 1 for a case 1) where only one subframe is scheduled using a PDCCH with DAI=1 (for example, a PDSCH scheduled using a PDCCH with DAI=1 or a DL SPS release PDCCH with DAI=1) or a case 2) where a PDSCH (SPS PDSCH) without a corresponding PDCCH is received only in one subframe. When considering this, if both of two cells are scheduled, $n_{HARQ}=3$ (when the cell y can transmit two transport blocks) or $n_{HARQ}=2$ (when the cell y can transmit one transport block). In addition, if only the cell x is scheduled, $n_{HARQ}=1$.

This can be expressed by the following equation.

$$n_{HARQ} = n_x + \sum_{k \in K_y} N_{k,y}^{received} \quad \text{[Equation 14]}$$

In the above equation, if the UE receives at least two PDSCHs, $n_x=2$. Further, if the UE receives only one PDSCH without a corresponding PDCCH in the subframe n-k(k∈$K_x$) of the serving cell x or receives a PDSCH scheduled by a PDCCH with DAI=1 or receives only one DL SPS release PDCCH with DAI=1, $n_x=1$. Otherwise, $n_x=0$. $N^{received}_{k,y}$ is the number of transport blocks or PDSCHs (SPS release PDSCHs) without a corresponding PDCCH, received in the subframe n-k(k∈$K_y$) of the serving cell y.

1.2.B: Simplified Power Allocation Method.

If a UE is scheduled for both of two serving cells, it is an optimal method to determine $n_{HARQ}$ by considering values that can be used for a consecutive ACK counting number. However, such a method disadvantageously has a great complexity. Accordingly, $n_{HARQ}$ may be determined in the same manner as the case of M=3 or 4 so that $n_{HARQ}$ is not changed according to a change in a value My. If the two serving cells have different UL-DL configurations and different values M, PUCCH transmit power may be determined according to the method described with reference to FIG. 16.

II. In case of (Mx, My)=(4, 2) of (3, 2)

2.1.A: Optimal Power Allocation Method.

If a UE is scheduled for both of two cells, 0(4), 1, 2, 3 are possible for a consecutive ACK counting number for a cell x. 0, 1, 2 are possible for the consecutive ACK counting number for a cell y. Accordingly, the total counting number that can be distinguished by channel selection is 12, and optimally, $n_{HARQ}=4$.

If a UE is scheduled only for one cell, 0(4), 1, 2, 3, that is, four types in total, are possible for the consecutive ACK counting number for the cell x. Accordingly, $n_{HARQ}=2$. 0, 1, 2, that is, three types in total, are possible for the consecutive ACK counting number for the cell y, and thus $n_{HARQ}=2$.

This can be expressed by the following equation.

$$n_{HARQ}=n_x+n_y \quad \text{[Equation 15]}$$

In the above equation, if the UE receives a DL SPS release PDCCH or PDSCH in a subframe n-k(k∈$K_x$) of a serving cell x, $n_x=2$. Otherwise, $n_x=0$. If the UE receives a DL SPS release PDCCH or PDSCH in a subframe n-k(k∈$K_y$) of a serving cell y, $n_y=2$. Otherwise, $n_y=0$.

When the consecutive ACK counting number for the cells x and y is transmitted by using channel selection, the consecutive ACK counting number is 0 or 1 for a case 1) where only one subframe is scheduled using a PDCCH with DAI=1 (for example, a PDSCH scheduled using a PDCCH with DAI=1 or a DL SPS release PDCCH with DAI=1) or a case 2) where a PDSCH (SPS PDSCH) without a corresponding PDCCH is received only in one subframe. When considering this, if both of two cells are scheduled, $n_{HARQ}=2$ (if both of two cells correspond to DAI=1) or 3 (if only one cell corresponds to DAI=1), and if only the cell x is scheduled, $n_{HARQ}=1$.

This can be expressed by the following equation.

$$n_{HARQ}=n_x+n_y \quad \text{[Equation 16]}$$

In the above equation, if the UE receives at least two PDSCHs, $n_x=2$. Further, if the UE receives only one PDSCH without a corresponding PDCCH in the subframe n-k(k∈$K_x$) of the serving cell x or receives a PDSCH scheduled by a PDCCH with DAI=1 or receives only one DL SPS release PDCCH with DAI=1, $n_x=1$. Otherwise, $n_x=0$. Further, if the UE receives at least two PDSCHs in the subframe n-k(k∈$K_y$) of the serving cell y, $n_y=2$. Alternatively, if the UE receives only one PDSCH without a corresponding PDCCH or receives a PDSCH scheduled by a PDCCH with DAI=1 or receives only one DL SPS release PDCCH with DAI=1, $n_y=1$. Otherwise, $n_y=0$.

2.1 B: Simplified Power Allocation Method

It is the same as the optimal power allocation method.

Meanwhile, an optimal method may be used for each Mx and My. That is, if ACK/NACK corresponds to a cell x, as in the case of M=4 or 3, a consecutive ACK counting number is transmitted by using a channel selection scheme, and as in the case of M=2, regarding ACK/NACK corresponding to a cell y, 2 ACK/NACK responses for two subframes are transmitted by using the channel selection scheme. If two transport blocks can exist in each subframe, ACK/NACK subjected to spatial bundling can be used.

2.2.A: Optimal Power Allocation Method.

If a UE is scheduled for both of two cells, 0(4), 1, 2, 3, i.e., four types in total, are possible for a consecutive ACK counting number for a cell x. A combination of ACK/NACK may vary depending on the number of subframes actually scheduled to a cell y. If two subframes are both scheduled, (A,A), (A,N), (N,A), (N,N), that is, four types, are possible. In a case where only one subframe is scheduled and the subframe is a previous subframe, (A,N), (N,N) are possible, and if the subframe is a next subframe, (N, A), (N,N) are possible. Therefore, the total number of ACK/NACK types is 4 (if two subframes are scheduled) or 2 (if only one subframe is scheduled). Accordingly, the total number of ACK/NACK combinations is 8 or 6. Therefore, optimally, $n_{HARQ}=4$ or 3.

If the UE is scheduled for only one cell, 0(4), 1, 2, 3, i.e., four types in total, are possible for a consecutive ACK counting number for the cell x. Therefore, $n_{HARQ}=2$. The consecutive ACK counting number for the cell y is 0, 1, 2, that is, three types in total, and thus $n_{HARQ}=2$.

What is estimated by using DL DAI may be included in the number of scheduled subframes.

This can be expressed by the following equation.

[Equation 17]

$$n_{HARQ} = n_x + \left( ((V^{DL}_{DAI,y} - U_{DAI,y}) \bmod 4) \cdot n_y^{ACK} + \sum_{k \in K_y} N_{k,y}^{received} \right)$$

$$= n_x + \left( (V^{DL}_{DAI,y} - U_{DAI,y}) \bmod 4 + \sum_{k \in K_y} N_{k,y}^{received} \right)$$

$$= n_x + \left( (V^{DL}_{DAI,y} - U_{DAI,y}) + \sum_{k \in K_y} N_{k,y}^{received} \right),$$

when $M_y \leq 4$

In the above equation, if the UE receives a DL SPS release PDCCH or PDSCH in a subframe n-k(k∈$K_x$) of a serving cell x, $n_x=2$. Otherwise, $n_x=0$. $V^{DL}_{DAI,y}$ denotes $V^{DL}_{DAI}$ of a serving cell y. $U_{DAI,y}$ is $U_{DAI}$ of the serving cell y. $n^{ACK}_y$ is the number of ACK/NACK bits corresponding to a DL transmission mode configured to the serving cell y. If spatial bundling is applied to ACK/NACK, $n^{ACK}_y=1$. Further, $N^{received}_{k,y}$ is the number of PDCCHs or the number of PDSCHs without a corresponding PDCCH, received in a subframe n-k(k∈$K_y$) of the serving cell y. If no transport block or SPS release PDCCH is detected in the subframe n-k(k∈$K_y$) of the serving cell y, $V^{DL}_{DAI,y}$ is 0.

When the consecutive ACK counting number for the cell x is transmitted by using channel selection, the consecutive ACK counting number is 0 or 1 for a case 1) where only one subframe is scheduled using a PDCCH with DAI=1 (for example, a PDSCH scheduled using a PDCCH with DAI=1 or a DL SPS release PDCCH with DAI=1) or a case 2) where a PDSCH (SPS PDSCH) without a corresponding PDCCH is received only in one subframe. When considering this, if both of two cells are scheduled, $n_{HARQ}=4$ (when two subframes are scheduled in the cell y) or $n_{HARQ}=3$ (when only one subframe is scheduled in the cell y).

This can be expressed by the following equation.

$$n_{HARQ} = n_x + \left(((V^{DL}_{DAI,y} - U_{DAI,y})\mod 4) \cdot n^{ACK}_y + \sum_{k \in K_y} N^{received}_{k,y}\right)$$

$$= n_x + \left((V^{DL}_{DAI,y} - U_{DAI,y})\mod 4 + \sum_{k \in K_y} N^{received}_{k,y}\right)$$

$$= n_x + \left((V^{DL}_{DAI,y} - U_{DAI,y}) + \sum_{k \in K_y} N^{received}_{k,y}\right),$$

when $M_y \leq 4$ [Equation 18]

In the above equation, if a UE receives at least two PDSCHs, $n_x=2$. If the UE receives only one PDSCH without a corresponding PDCCH or receives only one PDSCH scheduled by a PDCCH with DAI=1 in a subframe n-k (k∈$K_x$) of a serving cell x or receives only one a DL SPS release PDCCH with DAI=1, $n_x=1$. Otherwise, $n_x=0$. $V^{DL}_{DAI,y}$ denotes $V^{DL}_{DAI}$ of a serving cell y. $U_{DAI,y}$ is $U_{DAI}$ of the serving cell y. $n^{ACK}_y$ is the number of ACK/NACK bits corresponding to a DL transmission mode configured to the serving cell y. If spatial bundling is applied to ACK/NACK, $n^{ACK}_y=1$. Further, $N^{received}_{k,y}$ is the number of PDCCHs or the number of PDSCHs without a corresponding PDCCH, received in a subframe n-k(k∈$K_y$) of the serving cell y. If no transport block or SPS release PDCCH is detected in the subframe n-k(k∈$K_y$) of the serving cell y, $V^{DL}_{DAI,y}$ is 0.

2.2.B: Simplified Power Allocation Method

If a UE is scheduled for both of two serving cells, it is an optimal method to determine $n_{HARQ}$ by considering values that can be used for a consecutive ACK counting number. However, such a method disadvantageously has a great complexity. Accordingly, $n_{HARQ}$ may be determined in the same manner as the case of M=3 or 4 so that $n_{HARQ}$ is not changed according to a change in a value My.

The optimal power control method can be applied collectively for a case of M=max(Mx,Mx)≥3 as described in the above cases I and II. That is, in an aggregation between cells having different TDD configurations, a value M of different combinations may be generated for each cell. Therefore, there is a need to apply a more optimal method than a carrier aggregation having the same UL-DL configuration, and the following method may be used.

ALT X1: In case of based on DAI.

$$n_{HARQ} = \sum_{c=0}^{1} \min(N_{SPS,c} + V^{DL}_{DAI,c}, 2)$$ [Equation 19]

ALT X2:

$$n_{HARQ} = \sum_{c=0}^{1} \min\left((V^{DL}_{DAI,c} - U_{DAI,c}) + \sum_{k \in K_c} N^{received}_{k,c}, 2\right)$$ [Equation 20]

ALT Y: In case of based on only the number of received PDSCHs.

$$n_{HARQ} = \sum_{c=0}^{1} \min\left(\sum_{k \in K_c} N^{received}_{k,c}, 2\right)$$ [Equation 21]

If SPS scheduling is not allowed for a secondary cell, $N_{SPS,c}$ of the secondary cell is always 0.

The aforementioned methods may be always applied to a case where a UL-DL configuration of a cell is different, and may be applied only when Mx and My are different.

III. In case of (Mx, My)=(2, 1)

According to M=max(Mx, My), a channel selection scheme with M=2 is used identically between two cells. That is, one ACK/NACK is mapped to each subframe (if 2 transport blocks can be received in one subframe, one ACK/NACK is generated by applying spatial bundling), and thus ACK/NACK is generated for 3 subframes in total.

Accordingly, in a channel selection scheme using 4 PUCCH resources, an ACK/NACK bit (HARQ-ACK(3)) for a second subframe of a cell y may be used by always mapping to NACK.

Alternatively, in a channel selection scheme using 3 PUCCH resource, HARQ-ACK(0) may be mapped to ACK/NACK of a first subframe of a cell x, HARQ-ACK(1) may be mapped to ACK/NACK of a second subframe of the cell x, and HARQ-ACK(2) may be mapped to ACK/NACK of a first subframe of a cell y.

3.1.A: Optimal Power Allocation Method.

If a UE is scheduled for both of two cells, the number of ACK/NACK combinations is determined according to the number of subframes actually scheduled for a cell x. If two subframes are scheduled, (A,A), (A,N), (N,A), (N,N), that is, four types, are possible. In a case where only one subframe is scheduled and the subframe is a previous subframe, (A,N), (N,N) are possible, and if the subframe is a next subframe, (N, A), (N,N) are possible. The total number of combinations is 4 (if two subframes are scheduled) or 2 (if only one subframe is scheduled).

The maximum number of subframes actually scheduled for the cell y is 1, and thus only two combinations (i.e., ACK, NACK) are possible. Accordingly, the total number of possible combinations is 8, and optimally, $n_{HARQ}=3$ (if two subframes and one subframe are respectively scheduled in the cells x and y) or $n_{HARQ}=2$ (if one subframe is scheduled in the cell x and one subframe is scheduled in the cell y).

If the UE is scheduled only for one cell, $n_{HARQ}=2$, or $n_{HARQ}=1$ according to the number of ACK/NACK combinations for the cell x.

What is estimated by using DL DAI is included in the number of scheduled subframes.

The aforementioned procedure can be expressed by the following equation. This is a case where DAI can be received in scheduling of the cell y or where a DAI value is assumed to 1.

[Equation 22]

$$n_{HARQ} = \sum_{c=0}^{N_{cells}^{DL}-1} \left( ((V_{DAI,c}^{DL} - U_{DAI,c}) \mod 4) \cdot n_c^{ACK} + \sum_{k \in K_c} N_{k,c}^{received} \right)$$

$$= \sum_{c=0}^{N_{cells}^{DL}-1} \left( (V_{DAI,c}^{DL} - U_{DAI,c}) \mod 4 + \sum_{k \in K_c} N_{k,c}^{received} \right)$$

$$= \sum_{c=0}^{N_{cells}^{DL}-1} \left( (V_{DAI,c}^{DL} - U_{DAI,c}) + \sum_{k \in K_c} N_{k,c}^{received} \right),$$

when $M_c \leq 4$

In the above equation, $V^{DL}_{DAI,c}$ denotes $V^{DL}_{DAI}$ of a serving cell c. $U_{DAI,c}$ is $U_{DAI}$ of the serving cell c. $n^{ACK}_c$ is the number of ACK/NACK bits corresponding to a DL transmission mode configured to the serving cell c. If spatial bundling is applied to ACK/NACK, $n^{ACK}_c = 1$. Further, $N^{received}_{k,c}$ is the number of PDCCHs or the number of PDSCHs without a corresponding PDCCH, received in a subframe n-k(k∈$K_c$) of a serving cell c. $M_c$ is the number of elements of $K_c$. If spatial bundling is not applied to ACK/NACK, $N^{received}_{k,c}$ is the number of transport blocks or SPS release PDCCHs received in the subframe n-k(k∈$K_c$) of the serving cell c. $M_c$ is the number of elements of $K_c$. If no transport block or SPS release PDCCH is detected in the subframe n-k(k∈$K_c$) of the serving cell c, $V^{DL}_{DAI,c} = 0$.

If DAI of a cell y is not utilized, it can be expressed as follows.

[Equation 23]

$$n_{HARQ} = \left( ((V_{DAI,x}^{DL} - U_{DAI,x}) \mod 4) \cdot n_x^{ACK} + \sum_{k \in K_x} N_{k,x}^{received} \right) + \sum_{k \in K_y} N_{k,y}^{received}$$

$$= \left( (V_{DAI,yx}^{DL} - U_{DAI,y}) \mod 4 + \sum_{k \in K_y} N_{k,y}^{received} \right) + \sum_{k \in K_y} N_{k,y}^{received}$$

$$= \left( (V_{DAI,x}^{DL} - U_{DAI,y}) + \sum_{k \in K_y} N_{k,y}^{received} \right) + \sum_{k \in K_y} N_{k,y}^{received},$$

when $M_y \leq 4$

In the above equation, $V^{DL}_{DAI,x}$ denotes $V^{DL}_{DAI}$ of a serving cell x. $U_{DAI,x}$ is $U_{DAI}$ of the serving cell x. $n^{ACK}_x$ is the number of ACK/NACK bits corresponding to a DL transmission mode configured to the serving cell x. If spatial bundling is applied to ACK/NACK, $n^{ACK}_x = 1$. Further, $N^{received}_{k,c}$ (where c is x or y) is the number of PDCCHs or the number of PDSCHs without a corresponding PDCCH, received in a subframe n-k(k∈$K_c$) of a serving cell c. $M_c$ is the number of elements of $K_c$. If spatial bundling is not applied to ACK/NACK, $N^{received}_{k,c}$ is the number of transport blocks or SPS release PDCCHs received in the subframe n-k(k∈$K_c$) of the serving cell c. $M_c$ is the number of elements of $K_c$. If no transport block or SPS release PDCCH is detected in the subframe n-k(k∈$K_x$) of the serving cell c, $V^{DL}_{DAI,x} = 0$.

3.1.B: Simplified Power Allocation Method.

$n_{HARQ}$ may be determined in the same manner as the case of M=3 or 4 so that $n_{HARQ}$ is not changed according to a change in values My and My.

An optimal method may be used for each Mx and My. That is, if ACK/NACK corresponds to a cell x, as in the case of M=2, one ACK/NACK response is mapped to each subframe (if 2 transport blocks can be received in one subframe, one ACK/NACK response is generated by applying spatial bundling), and if ACK/NACK corresponds to a cell y, as in the case of M=1, two ACK/NACK responses (in case of two transport blocks) and one ACK/NACK response (in case of one transport block) are mapped according to the number of transport blocks.

3.2.A: Optimal Power Allocation Method.

If a UE is scheduled for both of two cells, the number of ACK/NACK combinations is determined according to the number of subframes actually scheduled for a cell x. If two subframes are both scheduled, (A,A), (A,N), (N,A), (N,N), that is, four types, are possible. In a case where only one of the two subframes is scheduled and the subframe is a previous subframe, (A,N), (N,N) are possible, and if the subframe is a next subframe, (N, A), (N,N) are possible. The total number of combinations is 4 (if two subframes are scheduled) or 2 (if only one subframe is scheduled). If one transport block is received or if an ACK/NACK response is made for a control channel, two combinations (i.e., ACK, NACK) are possible. Accordingly, since the total number of possible combinations is 8 (if the cell y can receive two transport blocks) or 6 (if the cell y can receive one transport block), optimally, $n_{HARQ}=4$ or 3, in that order.

If the UE is scheduled only for one cell, $n_{HARQ}=2$, or $n_{HARQ}=1$ according to the number of ACK/NACK combinations for the cell x, and $n_{HARQ}=2$ or $n_{HARQ}=1$ according to the number of ACK/NACK combinations for the cell y.

What is estimated by using DL DAI is included in the number of scheduled subframes.

The above procedure can be expressed as shown in the equation of ALT 3.1A. According to whether one transport block can be received or two transport blocks can be received, $N^{received}_{k,c}$ is defined differently, which is considered in the value $n_{HARQ}$.

3.2.B: Simplified Power Allocation Method.

$n_{HARQ}$ may be determined in the same manner as the case of M=3 or 4 so that $n_{HARQ}$ is not changed according to a change in values My and My.

The cell x applies $n_{HARQ}=1$ or 2 according to the number of scheduled subframes, and if the cell y is scheduled, applies $n_{HARQ}=2$ always so that $n_{HARQ}$ is not changed according to a change in a transport mode of the cell y.

The cell x applies $n_{HARQ}=2$ always according to the number of scheduled subframes if the cell y is scheduled, and applies $n_{HARQ}=2$ (if two transport blocks can be received) or 1 (if one transport block can be received) according to a change in the number of transport blocks of the cell y.

IV. In case of (Mx, My)=(4,0) or (3, 0)

In this case, the same method as the case of (Mx, My)=(4,1) or (3, 1) may be applied. However, the number of ACK/NACK combinations that can be generated by the cell y is 0, and may be handled equally as in a case where the cell y is not scheduled. A value related to the cell y is set to 0.

V. In case of (Mx, My)=(2,0).

In this case, the same method as the case of (Mx, My)=(2,1) may be applied. However, the number of ACK/NACK combinations that can be generated by the cell y is 0, and may be handled equally as in a case where the cell y is not scheduled. A value related to the cell y is set to 0.

Meanwhile, as shown in the above cases IV and V, if one of Mx and My is 0, a channel selection scheme determined in a single antenna configuration may be applied to a cell x. In this case, a table which shows that the number of PUCCH format 1b resources selectively used is Mx may be used. An optimal power allocation method for each combination of (Mx, My) is as follows.

A. In case of (Mx, My)=(4,0), (3,0), or (2, 0).

A.1: it is set to $n_{HARQ}$=Mx. Since the cell y is not scheduled, it is independent of possible ACK/NACK combinations. Accordingly, the cell is not considered in a power allocation.

Since ACK/NACK is always subjected to spatial bundling in channel selection for a single cell configuration, the maximum number of possible ACK/NACK combinations is $2^{Mx}$ in a duration of Mx subframes. That is, this is for determining maximum power based on Mx, not an optimal combination based on actual scheduling. However, since power is determined according to a change of Mx, it can be avoided that power is determined according to a maximum value of Mx which may be generated in a specific UL subframe of a specific UE.

A.2: Optimal power allocation method.

A.2.1: Optimal power allocation method.

0, 1, m, . . . , Mx are possible according to the number of subframes actually scheduled by a UE in a cell x. Therefore, the total number of possible ACK/NACK combinations is $2^m$. In this case, optimally, $n_{HARQ}$=m.

What is estimated by using DL DAI may be included when determining the number of scheduled subframes.

The following equation is based on the number of subframes that can be estimated by using the DL DAI.

$$n_{HARQ} = \sum_{c=0}^{N_{cells}^{DL}-1} \left( ((V_{DAI,c}^{DL} - U_{DAI,c}) \bmod 4) \cdot n_c^{ACK} + \sum_{k \in K_c} N_{k,c}^{received} \right)$$

$$= \sum_{c=0}^{N_{cells}^{DL}-1} \left( (V_{DAI,c}^{DL} - U_{DAI,c}) \bmod 4 + \sum_{k \in K_c} N_{k,c}^{received} \right)$$

$$= \sum_{c=0}^{N_{cells}^{DL}-1} \left( (V_{DAI,c}^{DL} - U_{DAI,c}) + \sum_{k \in K_c} N_{k,c}^{received} \right),$$

[Equation 24]

when $M_c \leq 4$

In the above equation, $V^{DL}_{DAI,c}$ denotes $V^{DL}_{DAI}$ of a serving cell c. $U_{DAI,c}$ is $U_{DAI}$ of the serving cell c. $n^{ACK}_c$ is the number of ACK/NACK bits corresponding to a DL transmission mode configured to the serving cell c. If spatial bundling is applied to ACK/NACK, $n^{ACK}_c$=1. Further, $N^{received}_{k,c}$ is the number of PDCCHs or the number of PDSCHs without a corresponding PDCCH, received in a subframe n-k(k∈$K_c$) of a serving cell c. $M_c$ is the number of elements of $K_c$. If spatial bundling is not applied to ACK/NACK, $N^{received}_{k,c}$ is the number of transport blocks or SPS release PDCCHs received in the subframe n-k(k∈$K_c$) of the serving cell c. $M_c$ is the number of elements of $K_c$. If no transport block or SPS release PDCCH is detected in the subframe n-k(k∈$K_c$) of the serving cell c, $V^{DL}_{DAI,c}$=0.

Meanwhile, $n_{HARQ}$ may be expressed as follows.

$$n_{HARQ} = \sum_{c=0}^{1} (N_{SPS,c} + V_{DAI,c}^{DL})$$

[Equation 25]

In the above equation, if SPS is not allowed for a secondary cell, $N_{SPS,c}$ of the secondary cell is always 0.

If DAI is not considered, $n_{HARQ}$ may be expressed as follows.

$$N_{HARQ} = \sum_{c=0}^{1} \sum_{k \in K_c} N_{k,c}^{received}$$

[Equation 26]

Meanwhile, if only a cell x is considered, $n_{HARQ}$ may be expressed as follows.

$$n_{HARQ} = \left( ((V_{DAI,x}^{DL} - U_{DAI,x}) \bmod 4) \cdot n_x^{ACK} + \sum_{k \in K_x} N_{k,x}^{received} \right)$$

$$= \left( (V_{DAI,x}^{DL} - U_{DAI,x}) \bmod 4 + \sum_{k \in K_x} N_{k,x}^{received} \right)$$

$$= \left( (V_{DAI,x}^{DL} - U_{DAI,x}) + \sum_{k \in K_x} N_{k,x}^{received} \right),$$

[Equation 27]

when $M_c \leq 4$

In the above equation, $V^{DL}_{DAI,x}$ denotes $V^{DL}_{DAI}$ of a serving cell x. $U_{DAI,x}$ is $U_{DAI}$ of the serving cell x. $n^{ACK}_x$ is the number of ACK/NACK bits corresponding to a DL transmission mode configured to the serving cell x. If spatial bundling is applied to ACK/NACK, $n^{ACK}_x$=1. Further, $N^{received}_{k,x}$ is the number of PDCCHs or the number of PDSCHs without a corresponding PDCCH, received in a subframe n-k(k∈$K_x$) of the serving cell x. $M_x$ is the number of elements of $K_x$. If spatial bundling is not applied to ACK/NACK, $N^{received}_{k,x}$ is the number of transport blocks or SPS release PDCCHs received in the subframe n-k(k∈$K_x$) of the serving cell x. $M_x$ is the number of elements of $K_x$. If no transport block or SPS release PDCCH is detected in the subframe n-k(k∈$K_x$) of the serving cell c, $V^{DL}_{DAI,x}$=0.

$n_{HARQ}$ may be expressed as follows by considering only the cell x.

$$n_{HARQ} = N_{SPS,x} + V^{DL}_{DAI,x}$$

[Equation 28]

In the above equation, if SPS is not allowed for a secondary cell, $N_{SPS,c}$ of the secondary cell is always 0.

If DAI is not considered and only a cell x is considered, $n_{HARQ}$ may be expressed as follows.

$$n_{HARQ} = \sum_{k \in K_c} N_{k,x}^{received}$$

[Equation 29]

B. In case of (Mx, My)=(1, 0).

Since a PUCCH format 1b is used in this case, $n_{HARQ}$ is set to the number of ACK/NACK bits transmitted in a corresponding subframe.

The aforementioned cases A and B are also applicable to a case where channel selection is applied when a single cell is configured to a UE. It may be applied only when spatial orthogonal resource transmit diversity (SORTD) is applied. That is, in case of channel selection for a single cell of TDD, $n_{HARQ}$ may be determined on the basis of the number of transmission bits in a single-antenna port transmission, and $n_{HARQ}$ may be determined on the basis of the number of PDSCHs actually received by the UE in a two-antenna port transmission.

This may be applied only for a UE capable of supporting an aggregation of TDD cells having different UL-DL configurations. The UE may always apply it to a single cell configuration or may be instructed as to whether to use it through an RRC message.

The following table shows a required SNR in case of a single antenna port (SAP) transmission and a case of a 2-antenna port transmission using SORTD in a situation where 2 receive (Rx) antennas are used in a channel of ETU 3 km and a PUCCH format 1b with channel selection with M=4 is used.

TABLE 13

| TxD schemes | Number of received PDSCHs | | |
|---|---|---|---|
| | 2 | 3 | 4 |
| SAP | −7.5 | −7.0 | −6.2 |
| SORTD | −8.7 | −7.8 | −7.2 |

In case of the conventional SAP, $n_{HARQ}$ is set on the basis of the value M, and thus $n_{HARQ}$=4. Transmit power is always adjusted to −6.2 dB. If the number of PDSCHs actually scheduled by the UE is less than or equal to 4, for example, 2, the transmit power is adjusted to −7.5 dB, and thus unnecessary power is consumed. This acts as an interference to the UE using the same frequency resource, which results in a deterioration of an overall system performance.

In particular, even in case of using the SORTD, the transmit power is adjusted to −7.2 dB if $n_{HARQ}$ is based on M. Since SAP transmit power can be adjusted to −7.5 dB in a case where scheduling of 2 PDSCHs is performed in general, there is no reason to waste the transmit power by using the SORTD which uses an additional resource.

Therefore, even if the SORTD is used to a minimum extent possible, the value $n_{HARQ}$ is preferably adjusted to the number of actually received PDSCHs. In case of SAP transmission in TDD single cell channel selection based on the conventional Rel-8~10, $n_{HARQ}$ is determined based on M. Therefore, additional signaling which is dependent on a release version requires to determine the $n_{HARQ}$ only in Rel-11, whereas in case of a TDD single cell channel selection SORTD transmission, since it is applied starting from Rel-11, additional signaling is not required to determine $n_{HARQ}$ on the basis of an actually received PDSCH.

Meanwhile, the simplified power allocation method may always be applied to an aggregation of cells having different UL-DL configurations, or may always be applied to a case where (Mx, My)=(1:1) is not true, or may always be applied to a case where Mx=My is not true.

Figure 17:
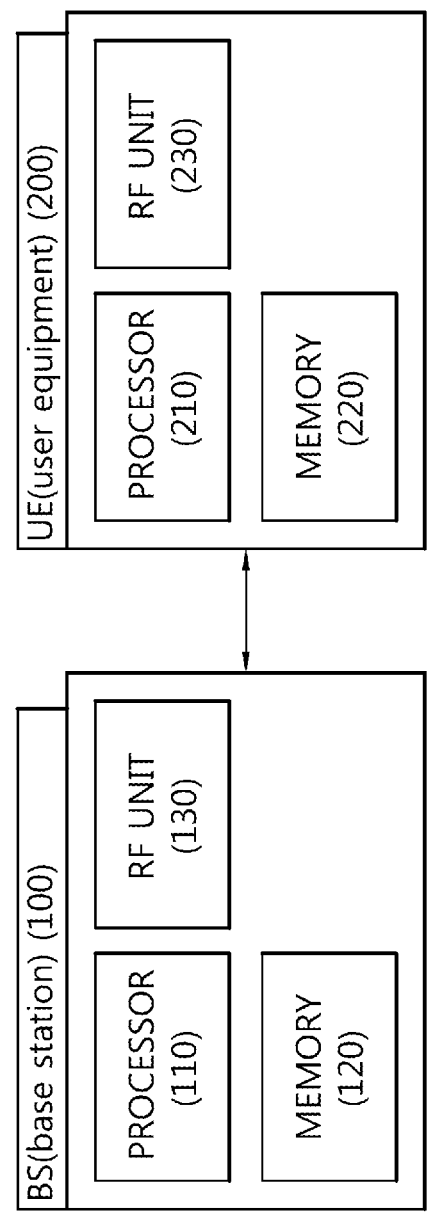
FIG. 17 illustrates configurations of a BS and a UE according to an embodiment of the present invention.

FIG. 17 illustrates configurations of a BS and a UE according to an embodiment of the present invention.

ABS 100 includes a processor 110, a memory 120, and a radio frequency (RF) unit 130. The processor 110 implements proposed functions, procedures, and/or methods. The memory 120 is connected to the processor 110 to store various information for driving the processor 110. The RF unit 130 is connected to the processor 110 to transmit/receive a radio signal.

A UE 200 includes a processor 210, a memory 220, and an RF unit 230. The processor 210 implements proposed functions, procedures, and/or methods. The memory 220 is connected to the processor 210 to store various information for driving the processor 210. The RF unit 230 is connected to the processor 210 to transmit/receive a radio signal.

The processor 110 or 210 may include an ASIC (application-specific integrated circuit), a data processor and/or a converter to convert a baseband signal and a wireless signal into each other. The memory 120 or 220 may include a ROM (read-only memory), an RAM (random access memory), a flash memory, a memory card, a storage medium and/or other storage devices. The RF unit 130 or 203 may include at least one antenna to transmit and/or receive the wireless signal. When the embodiment is implemented by software, the above scheme may be implemented by a module (procedure, function, and the like) to perform the above function. The module is stored in the memory 120 or 120 and may be implemented by the processor 110 or 210. The memory 120 or 220 may be installed inside or outside the processor 110 or 210, and may be connected to the processor 110 or 210 through various known means.

What is claimed is:

1. A method for determining transmit power of an uplink (UL) control channel of a user equipment (UE) to which two cells having different UL-downlink (DL) configurations are assigned, the method comprising:
   determining, by the UE, a maximum value M between N1 and N2,
   wherein N1 is a number of downlink subframes associated with a subframe n of a first cell having a first UL-DL configuration, and
   wherein N2 is a number of downlink subframes associated with a subframe n of a second cell having a second UL-DL configuration;
   determining, by the UE, a parameter value based on the maximum value M; and
   transmitting, by the UE, the UL control channel in the subframe n of the first cell at a transmit power determined based on the parameter value,
   wherein if the maximum value M is 3 or 4, the parameter value is either 2 or 4 based on whether or not a data channel or a control channel indicating a semi-persistent scheduling (SPS) release is received by the UE in a subframe n-k of only one cell between the first cell and the second cell, and
   wherein n, M, k, N1, and N2 are integers greater than or equal to 0.

2. The method of claim 1, wherein a value of k is determined by the following table for each UL-DL configuration and the subframe n of the first cell and the second cell:

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7 | — | — |

-continued

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| | | | | | | | | 4, 6 | | |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | —. |

3. The method of claim 1, wherein the first cell is a primary cell in which the UE performs an initial connection establishment procedure or a connection re-establishment procedure with respect to a base station.

4. The method of claim 3, wherein the second cell is a secondary cell which is added to the UE in addition to the primary cell.

5. The method of claim 1, wherein the first UL-DL configuration and the second UL-DL configuration are two different configurations among UL-DL configurations of the following table:

| UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a downlink subframe, S denotes a special subframe, and U denotes an uplink subframe.

6. The method of claim 1, wherein one of N1 and N2 is 4, and the other one of N1 and N2 is 0, 1, or 2.

7. The method of claim 1, wherein the first cell and the second cell are time division duplex (TDD) cells.

8. An apparatus for determining transmit power of an uplink (UL) control channel, the apparatus comprising:

a transceiver configured to transmit and receive a radio signal; and a processor operatively coupled to the transceiver, wherein the processor is configured to:

determine a maximum value M between N1 and N2, wherein N1 is a number of downlink (DL) subframes associated with a subframe n of a first cell having a first UL-DL configuration, and wherein N2 is a number of downlink subframes associated with a subframe n of a second cell having a second UL-DL configuration, determine a parameter value based on the maximum value M, and control the transceiver to transmit the UL control channel in the subframe n of the first cell at a transmit power determined based on the parameter value, wherein if the maximum value M is 3 or 4, the parameter value is either 2 or 4 based on whether or not a data channel or a control channel indicating a semi-persistent scheduling (SPS) release is received in a subframe n-k of only one cell between the first cell and the second cell, and wherein n, M, k, N1, and N2 are integers greater than or equal to 0.

* * * * *